United States Patent
Kashyap et al.

(10) Patent No.: US 11,093,579 B2
(45) Date of Patent: Aug. 17, 2021

(54) FP16-S7E8 MIXED PRECISION FOR DEEP LEARNING AND OTHER ALGORITHMS

(71) Applicant: Intel Corporation, Santa Clara, CA (US)

(72) Inventors: Sidharth N. Kashyap, Edinburgh (GB); Angus Lepper, Edinburgh (GB); Peter Boyle, Edinburgh (GB)

(73) Assignee: Intel Corporation, Santa Clara, CA (US)

(*) Notice: Subject to any disclaimer, the term of this patent is extended or adjusted under 35 U.S.C. 154(b) by 68 days.

(21) Appl. No.: 16/122,030

(22) Filed: Sep. 5, 2018

(65) Prior Publication Data
US 2019/0042544 A1 Feb. 7, 2019

(51) Int. Cl.
*G06F 17/16* (2006.01)
*G06F 7/544* (2006.01)
(Continued)

(52) U.S. Cl.
CPC ............ *G06F 17/16* (2013.01); *G06F 7/5443* (2013.01); *G06F 9/30036* (2013.01);
(Continued)

(58) Field of Classification Search
CPC .... G06F 17/16; G06F 7/5443; G06F 9/30036; G06F 9/30145; G06N 3/08; G06N 3/046
See application file for complete search history.

(56) References Cited

U.S. PATENT DOCUMENTS 5,247,632 A    9/1993  Newman
5,475,822 A   12/1995  Sibigtroth et al.
(Continued)

FOREIGN PATENT DOCUMENTS

KR   10-2011-0079495 A    7/2011
WO       2004/053841 A2    6/2004
(Continued)

OTHER PUBLICATIONS

Extended European Search Report and Search Opinion, EP App. No. 19183087.6, dated Dec. 12, 2019, 9 pages.
(Continued)

*Primary Examiner* — Michael D. Yaary
(74) *Attorney, Agent, or Firm* — Nicholson De Vos Webster & Elliott LLP

(57) ABSTRACT

Disclosed embodiments relate to mixed-precision vector multiply-accumulate (MPVMAC) In one example, a processor includes fetch circuitry to fetch a compress instruction having fields to specify locations of a source vector having N single-precision formatted elements, and a compressed vector having N neural half-precision (NHP) formatted elements, decode circuitry to decode the fetched compress instruction, execution circuitry to respond to the decoded compress instruction by: converting each element of the source vector into the NHP format and writing each converted element to a corresponding compressed vector element, wherein the processor is further to fetch, decode, and execute a MPVMAC instruction to multiply corresponding NHP-formatted elements using a 16-bit multiplier, and accumulate each of the products with previous contents of a corresponding destination using a 32-bit accumulator.

18 Claims, 28 Drawing Sheets

(51) Int. Cl.
*G06N 3/08* (2006.01)
*G06F 9/30* (2018.01)
*G06N 5/04* (2006.01)
*G06N 3/063* (2006.01)
*G06N 3/04* (2006.01)

(52) U.S. Cl.
CPC ........... *G06F 9/30145* (2013.01); *G06N 3/04* (2013.01); *G06N 3/063* (2013.01); *G06N 3/08* (2013.01); *G06N 5/046* (2013.01); *G06F 2207/382* (2013.01)

(56) References Cited

U.S. PATENT DOCUMENTS

| | | | |
|---|---|---|---|
| 5,892,962 | A | 4/1999 | Cloutier |
| 6,161,219 | A | 12/2000 | Ramkumar et al. |
| 6,212,112 | B1 | 4/2001 | Naura et al. |
| 6,332,186 | B1 | 12/2001 | Elwood et al. |
| 6,877,020 | B1 | 4/2005 | Bratt et al. |
| 7,003,542 | B2 | 2/2006 | Devir |
| 7,009,615 | B1 * | 3/2006 | Kilgard .................... G06T 1/60 345/506 |
| 7,209,939 | B2 | 4/2007 | Castrapel et al. |
| 7,725,521 | B2 | 5/2010 | Chen et al. |
| 7,792,895 | B1 | 9/2010 | Juffa et al. |
| 7,873,812 | B1 | 1/2011 | Mimar |
| 7,912,889 | B1 | 3/2011 | Juffa et al. |
| 7,932,910 | B2 | 4/2011 | Hansen et al. |
| 8,392,487 | B1 | 3/2013 | Mesh et al. |
| 8,984,043 | B2 | 3/2015 | Ginzburg et al. |
| 9,442,723 | B2 | 9/2016 | Yang et al. |
| 9,906,359 | B2 | 2/2018 | Gueron |
| 9,960,907 | B2 | 5/2018 | Gueron |
| 10,535,114 | B2 | 1/2020 | Bolz |
| 2003/0126176 | A1 | 7/2003 | Devir |
| 2004/0111587 | A1 | 6/2004 | Nair et al. |
| 2005/0193050 | A1 | 9/2005 | Sazegari |
| 2006/0101245 | A1 | 5/2006 | Nair et al. |
| 2006/0149803 | A1 * | 7/2006 | Siu ....................... G06F 9/3885 708/501 |
| 2006/0190517 | A1 | 8/2006 | Guerrero |
| 2007/0186210 | A1 | 8/2007 | Hussain et al. |
| 2008/0071851 | A1 | 3/2008 | Zohar et al. |
| 2008/0140994 | A1 | 6/2008 | Khailany et al. |
| 2008/0208942 | A1 | 8/2008 | Won et al. |
| 2009/0043836 | A1 | 2/2009 | Dupaquis et al. |
| 2009/0150654 | A1 * | 6/2009 | Oberman ............ G06F 9/30112 712/221 |
| 2009/0292758 | A1 | 11/2009 | Brokenshire et al. |
| 2009/0300091 | A1 | 12/2009 | Brokenshire et al. |
| 2009/0300249 | A1 | 12/2009 | Moyer et al. |
| 2010/0180100 | A1 | 7/2010 | Lu et al. |
| 2010/0325187 | A1 | 12/2010 | Juffa et al. |
| 2012/0079252 | A1 | 3/2012 | Sprangle |
| 2012/0113133 | A1 | 5/2012 | Shpigelblat |
| 2012/0137074 | A1 | 5/2012 | Kim et al. |
| 2012/0254588 | A1 | 10/2012 | Adrian et al. |
| 2012/0314774 | A1 | 12/2012 | Yang et al. |
| 2013/0305020 | A1 | 11/2013 | Valentine et al. |
| 2014/0149480 | A1 | 5/2014 | Catanzaro et al. |
| 2015/0067302 | A1 | 3/2015 | Gueron |
| 2015/0199266 | A1 | 7/2015 | Franchetti et al. |
| 2015/0378741 | A1 * | 12/2015 | Lukyanov ........... G06F 9/30014 712/226 |
| 2018/0113708 | A1 | 4/2018 | Corbal et al. |

FOREIGN PATENT DOCUMENTS

| | | |
|---|---|---|
| WO | 2016/003740 A1 | 1/2016 |
| WO | 2016/105727 A1 | 6/2016 |
| WO | 2018/125250 A1 | 7/2018 |

OTHER PUBLICATIONS

Intel, "Intel Architecture Instruction Set Extensions Programming Reference", Reference No. 319433-024, Feb. 2016, pp. 5-120-5-126.

Narang S., et al., "Mixed Precision Training," published as a conference paper at ICLR 2018, Feb. 15, 2018, Retrieved from the Internet: https://arxiv.org/pdf/1710.03740.pdf (retrieved on Jul. 24, 2019), 12 pages.

Saeta B., "Training Performance—A user's guide to converge faster", TensorFlow Development Summit 2018, Mar. 1, 2018, 54 pages.

Sze V. et al., "Efficient Processing of Deep Neural Networks: A Tutorial and Survey," arxiv.org, Cornell University Library, Mar. 27, 2017, pp. 1-31.

Corrected Notice of Allowability, U.S. Appl. No. 15/201,442, dated Jan. 22, 2019, 5 pages.

Corrected Notice of Allowability, U.S. Appl. No. 15/201,442, dated Mar. 11, 2019, 2 pages.

International Preliminary Report on Patentability, PCT App. No. PCT/US2017/040546, dated Oct. 3, 2019, 10 pages.

International Search Report and Written Opinion, PCT App. No. PCT/US2017/040546, dated Jan. 24, 2018, 15 pages.

Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.

Non-Final Office Action, U.S. Appl. No. 15/201,442, dated May 4, 2018, 11 pages.

Non-Final Office Action, U.S. Appl. No. 16/398,200, dated Jul. 28, 2020, 17 pages.

Notice of Allowance, U.S. Appl. No. 15/201,442, dated Dec. 14, 2018, 5 pages.

Intention to Grant, EP App. No. 19183087.6, dated Apr. 21, 2021, 6 pages.

* cited by examiner

Mixed Precision Vector Multiplication (MPVM) Instruction
Floating-Point Formats
400
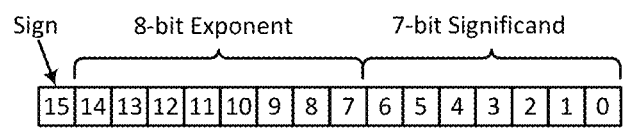
S7E8 Format
402
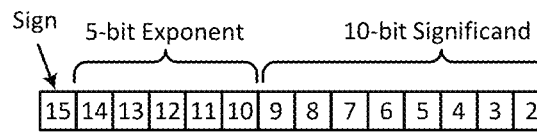
IEEE 754 Half-Precision (FP16-S5E10 / binary16) Format
404
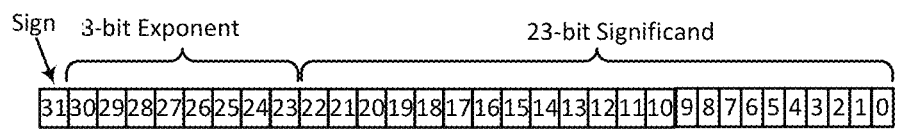
IEEE 754 single-precision (FP32 / binary32) Format
406
FIG. 4A

650

(VCVTPS2PNH convert S7E8 to FP32 Instruction 652

FETCH, USING FETCH CIRCUITRY, AN EXPAND INSTRUCTION HAVING FIELDS TO SPECIFY LOCATIONS OF A COMPRESSED SOURCE VECTOR HAVING N NEURAL HALF-PRECISION (NHP) FORMATTED ELEMENTS, AND A DESTINATION VECTOR HAVING N SINGLE-PRECISION FORMATTED ELEMENTS
656

DECODE, USING DECODE CIRCUITRY, THE FETCHED EXPAND INSTRUCTION
658

RESPOND, USING EXECUTION CIRCUITRY, TO THE DECODED EXPAND INSTRUCTION BY CONVERTING EACH ELEMENT OF THE COMPRESSED SOURCE VECTOR INTO THE SINGLE-PRECISION FORMAT, AND WRITING EACH CONVERTED ELEMENT TO A CORRESPONDING DESTINATION VECTOR ELEMENT
660

WRITE BACK EXECUTION RESULTS / RETIRE MPVMAC INSTRUCITON
662

FIG. 6B

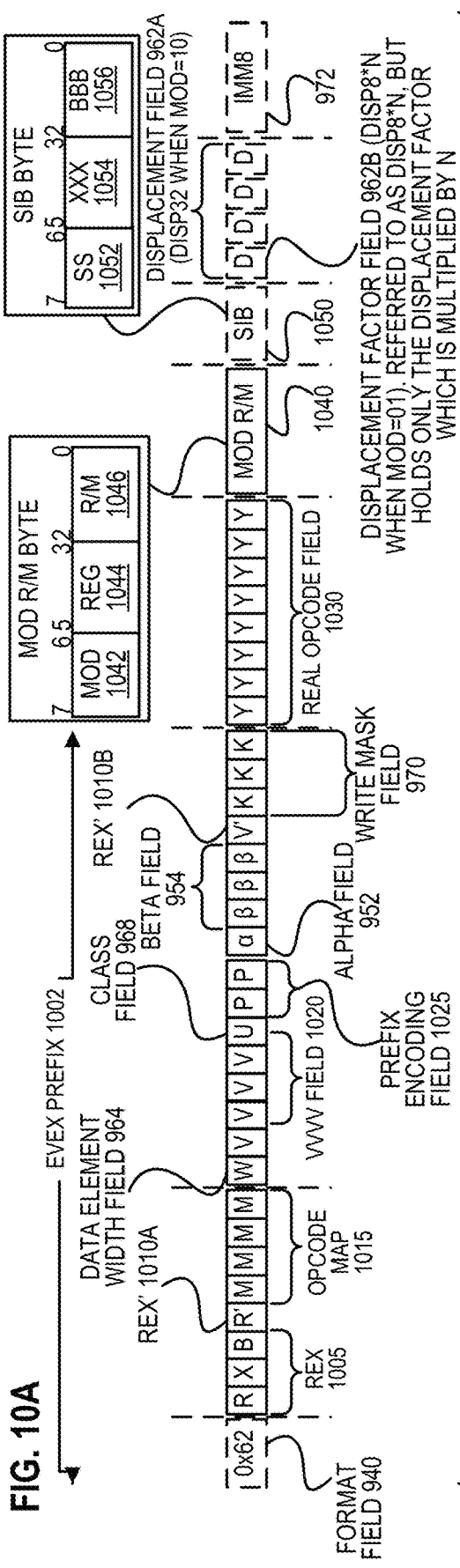
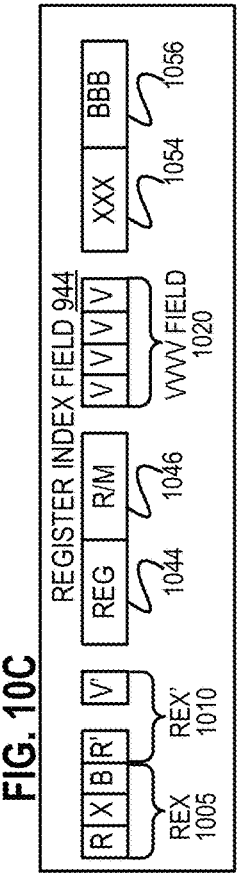
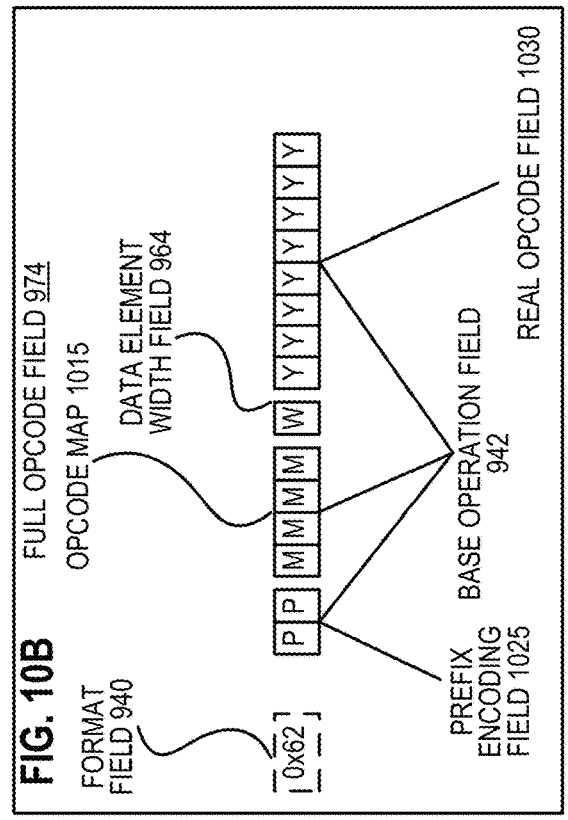
FIG. 10A
FIG. 10B
FIG. 10C

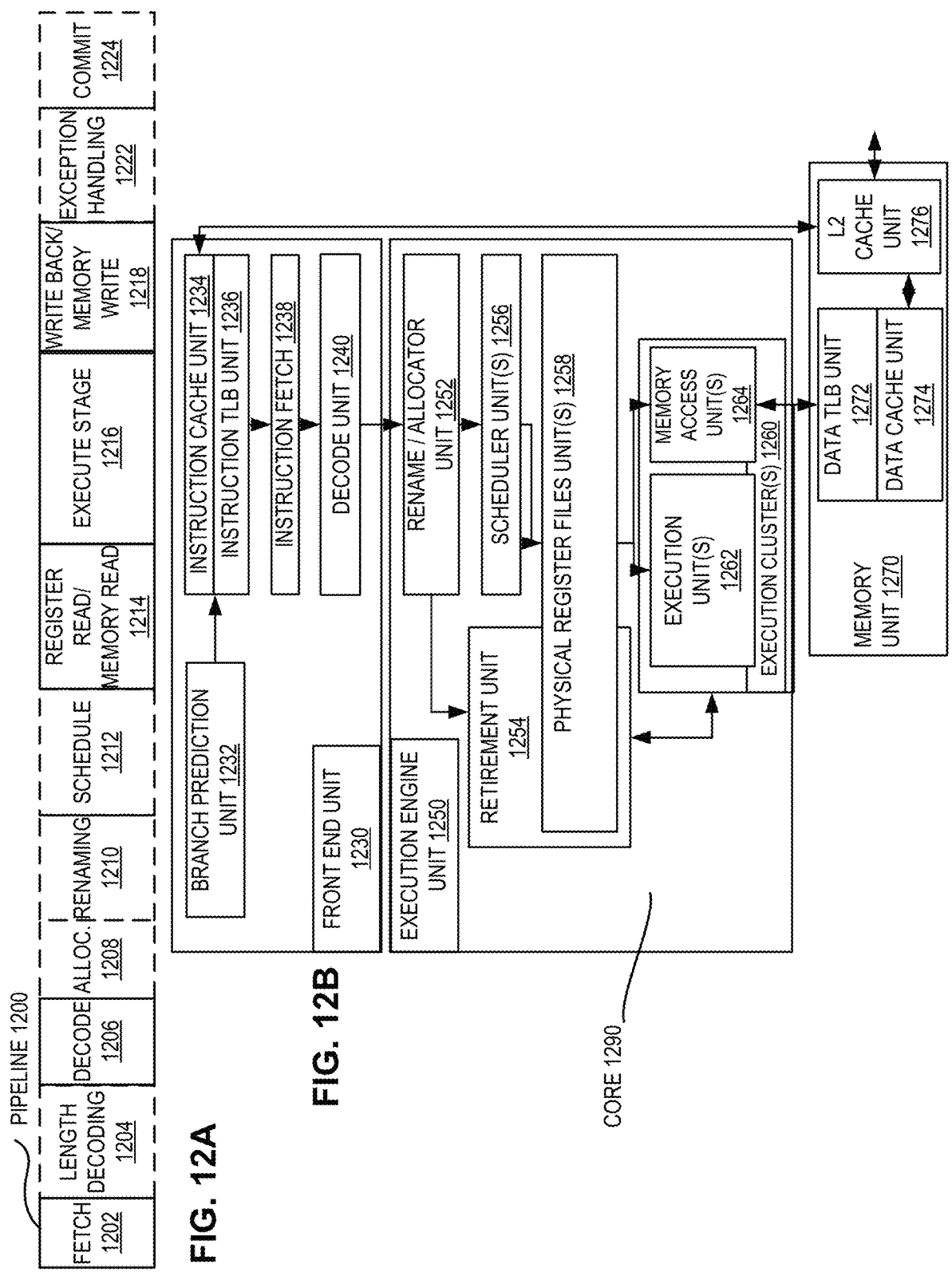

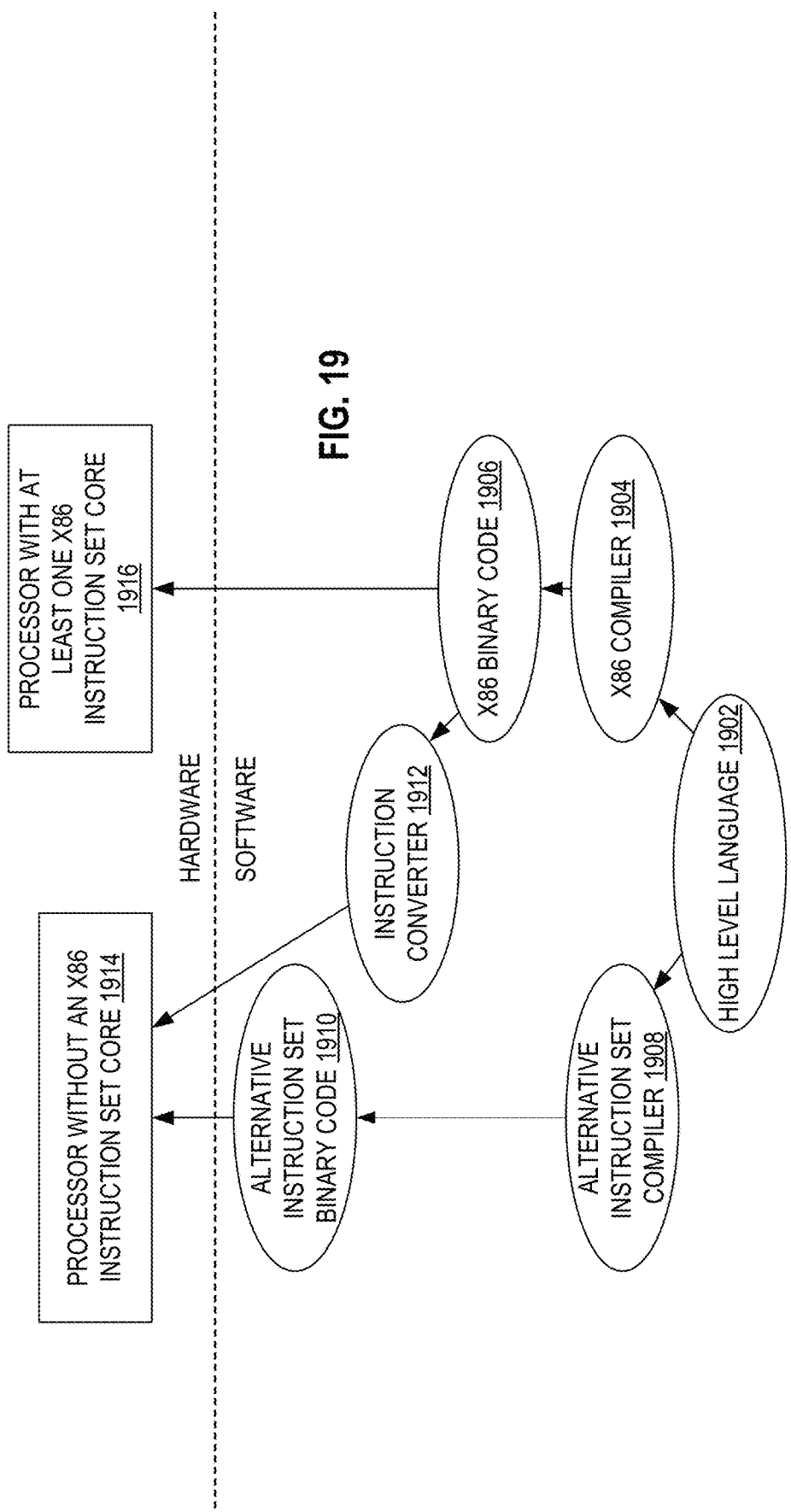

FP16-S7E8 MIXED PRECISION FOR DEEP LEARNING AND OTHER ALGORITHMS

FIELD OF THE INVENTION

The field of invention relates generally to computer processor architecture, and, more specifically, to FP16-S7E8 mixed-precision for deep learning and other algorithms.

BACKGROUND

Many of today's hardware accelerators for machine learning with neural networks perform mainly matrix multiplication during both training and inference. Hardware accelerators for machine learning strive to achieve the best raw performance numbers and power to performance ratio values.

Machine learning architectures, such as deep neural networks, have been applied to fields including computer vision, image recognition, speech recognition, natural language processing, audio recognition, social network filtering, machine translation, bioinformatics and drug design.

Matrix multiplication is a key performance/power limiter for many algorithms, including machine learning.

Attempts to accelerate instruction throughput and improve performance can try to use reduced precision, such as IEEE-FP16 (S10E5), which is a half-precision floating-point (FP) format having a 10-bit significand (sometimes referred to as a mantissa, a coefficient, an argument, or a fraction) and 5-bit exponent, and is defined In the IEEE 754-2008 standard promulgated by the Institute of Electrical and Electronics Engineers (IEEE). When IEEE-FP16 (S10E5) is used, however, due to an over-allocation of significand vs. exponent bits, it tends to be time-consuming, require expert knowledge, and may produce less aggressive (i.e. slower to train) hyperparameters (i.e., properties that are fixed before the training process begins and do not change during or as a result of the training process) than obtained with e.g. single-precision.

BRIEF DESCRIPTION OF THE DRAWINGS

The present invention is illustrated by way of example and not limitation in the figures of the accompanying drawings, in which like references indicate similar elements and in which:

FIG. 4A shows block diagrams illustrating floating-point formats, according to some embodiments;

FIG. 6B is a block flow diagram illustrating an embodiment of a processor executing an instruction to convert formats from neural half-precision to standard single-precision;

FIG. 9A is a block diagram illustrating a generic vector friendly instruction format and class A instruction templates thereof according to some embodiments of the invention;

FIG. 9B is a block diagram illustrating the generic vector friendly instruction format and class B instruction templates thereof according to some embodiments of the invention;

FIG. 10A is a block diagram illustrating an exemplary specific vector friendly instruction format according to some embodiments of the invention;

FIG. 10B is a block diagram illustrating the fields of the specific vector friendly instruction format that make up the full opcode field according to one embodiment;

FIG. 10C is a block diagram illustrating the fields of the specific vector friendly instruction format that make up the register index field according to one embodiment;

FIG. 12A is a block diagram illustrating both an exemplary in-order pipeline and an exemplary register renaming, out-of-order issue/execution pipeline according to some embodiments;

FIG. 12B is a block diagram illustrating both an exemplary embodiment of an in-order architecture core and an exemplary register renaming, out-of-order issue/execution architecture core to be included in a processor according to some embodiments;

FIG. 13A is a block diagram of a single processor core, along with its connection to the on-die interconnect network and with its local subset of the Level 2 (L2) cache, according to some embodiments;

FIG. 13B is an expanded view of part of the processor core in FIG. 13A according to some embodiments;

FIG. 15 shown a block diagram of a system in accordance with some embodiments;

FIG. 16 is a block diagram of a first more specific exemplary system in accordance with some embodiment;

FIG. 17 is a block diagram of a second more specific exemplary system in accordance with some embodiments;

FIG. 18 is a block diagram of a System-on-a-Chip (SoC) in accordance with some embodiments; and FIG. 19 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1:
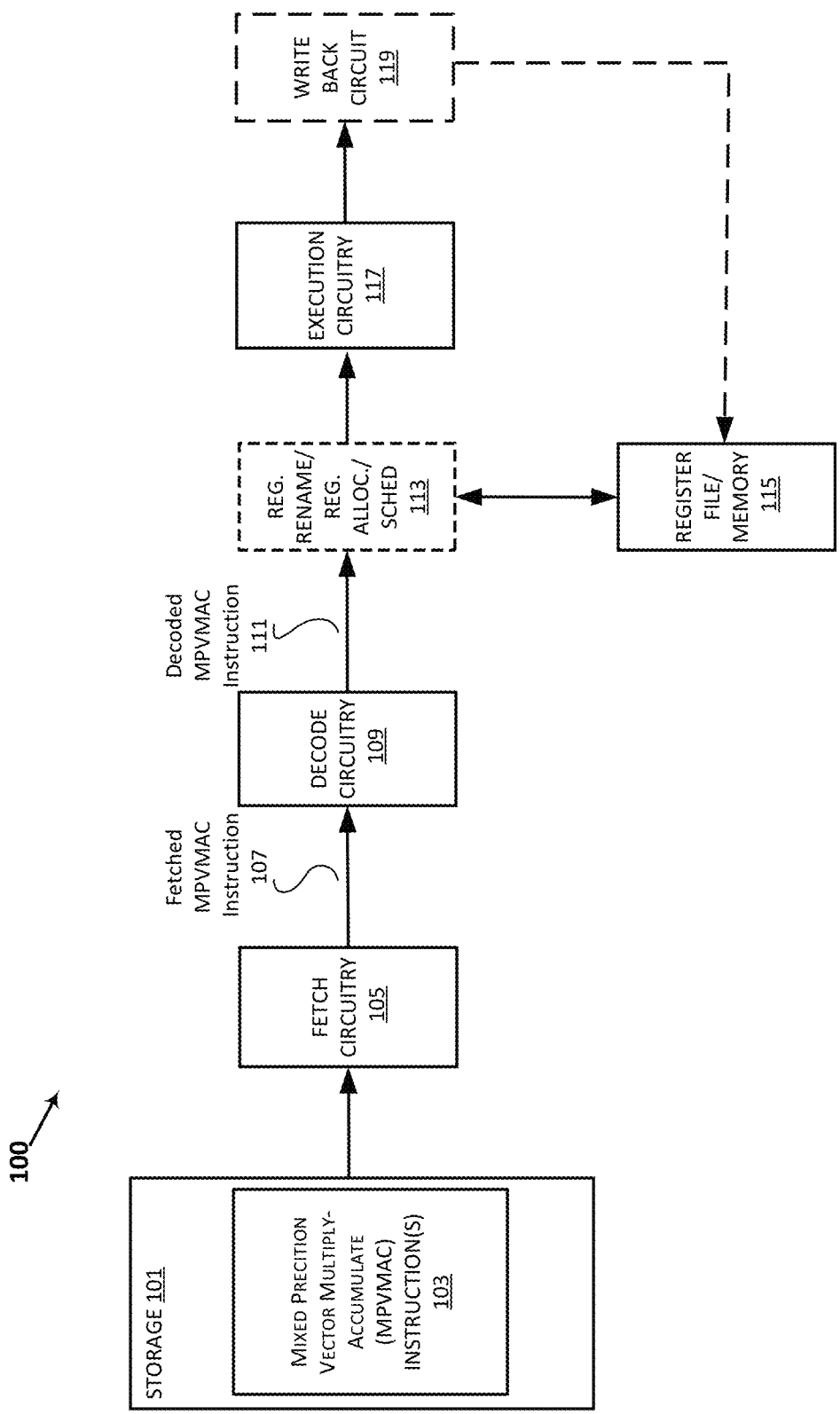
FIG. 1 is a block diagram illustrating processing components for executing a mixed-precision vector multiply-accumulate (MPVMAC) instruction, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

The following description discloses various systems and method for performing mixed-precision vector multiply-accumulate (MPVMAC) instructions using a 16-bit format that includes a sign bit, a seven-bit significand, and an 8-bit exponent. The format is referred to as an FP16-S7E8 format (on account of its significand and exponent bit-widths), or as a neural half-precision format (because it is shown to improve performance of neural networks used in a machine-learning context, including during both the training and the inference phases). Executing the disclosed MPVMAC instruction, according to some embodiments, is to use the reduced-precision FP16-S7E8 (neural half-precision) format during the multiplication, followed by a 32-bit single-precision accumulation, which can use the FP32/binary32 single-precision floating-point format defined in IEEE 754-2008.

Use of the FP16-S7E8 format for the multiplication is expected to yield memory bandwidth, power, and silicon area benefits of lower precision, but with little negative impact in terms of training and inference performance. Use of the FP16-S7E8 format in conjunction with performing the MPVMAC instruction is expected to improve performance and power-efficiency of neural network processing and similar deep learning workloads.

Disclosed embodiments avoid relying on the IEEE-FP16 (S10E5) reduced precision format, which can lead to an architecture that does not work with the low-precision multiplication. Disclosed embodiments also refrain from forcing the IEEE-FP16 (S10E5) format to work by retaining a copy of each data element in binary32 format, so as to enable rewinding and starting over if and when the algorithm fails. Such approaches require a significant amount of additional memory and silicon area.

Disclosed embodiments therefore use a 16-bit format for the multiplications. Such a format works well in a neural network application, so the format is sometimes referred to as "neural" half-precision. The format is also referred to as FP16-S7E8 (or S7E8-FP16), based on the 7-bit significand and the 8-bit exponent. Using the disclosed FP16-S7E8 format represents numbers with very nearly the same range as numbers with FP32 format. Disclosed embodiments further include a mixed-precision multiply-accumulate instruction which uses this 16-bit FP16-S7E8 format for the multiplication but accumulates using 32-bit single-precision.

Disclosed embodiments are expected to improve GEMM (GEneral Matrix Multiplication) performance. In terms of silicon area, disclosed embodiments are expected to be modestly cheaper than IEEE-FP16 (S10E5), and significantly cheaper than 32-bit binary32. The area cost of the floating-point multiplier is dominated by the mantissa multiplier, and this is proportional to the square of the number of mantissa bits. Implementing GEMM using the disclosed FP16-S7E8 format is expected to require significantly less silicon area and expend less power than an implementation utilizing FP32 multipliers.

Disclosed embodiments describe a new 16-bit FP representation, illustrated in FIG. 4A, to suit the training requirements of deep learning workloads. The disclosed format is to be used as part of a mixed-precision fused multiply-accumulate operation, illustrated in FIG. 2.

FIG. 1 is a block diagram illustrating processing components for executing a mixed-precision vector multiply-accumulate (MPVMAC) instruction, according to some embodiments. As illustrated, storage 101 stores MPVMAC instruction(s) 103 to be executed. As described further below, in some embodiments, computing system 100 is an SIMD processor to concurrently process multiple elements of packed-data vectors, such as matrices.

In operation, the MPVMAC instruction(s) 103 is fetched from storage 101 by fetch circuitry 105. The fetched MPVMAC instruction 107 is decoded by decode circuitry 109. The MPVMAC instruction format, which is further illustrated and described with respect to FIGS. 8, 9A-B, and 10A-D, has fields (not shown here) to specify first, second, and destination matrices, the specified second matrix in some embodiments being a sparse matrix with a sparsity less than one (the sparsity being the proportion of non-zero elements, i.e., the second matrix has at least some zero-valued elements). Decode circuitry 109 decodes the fetched MPVMAC instruction 107 into one or more operations. In some embodiments, this decoding includes generating a plurality of micro-operations to be performed by execution circuitry (such as execution circuitry 117). The decode circuit 109 also decodes instruction suffixes and prefixes (if used). Execution circuitry 117 is further described and illustrated below, at least with respect to FIGS. 2-6B, 12A-B and 13A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded MPVMAC instruction 111 for execution on execution circuitry 117 out of an instruction pool (e.g., using a reservation station in some embodiments).

Registers (register file) and/or memory 115 store data as operands of decoded MPVMAC instruction 111 to be operated on by execution circuitry 117. Exemplary register types include writemask registers, packed data registers, general purpose registers, and floating-point registers, as further described and illustrated below, at least with respect to FIG. 11.

In some embodiments, write back circuit 119 commits the result of the execution of the decoded MPVMAC instruction 111. Execution circuitry 117 and system 100 are further illustrated and described with respect to FIGS. 2-6B, 12A-B and 13A-B.

Figure 2:
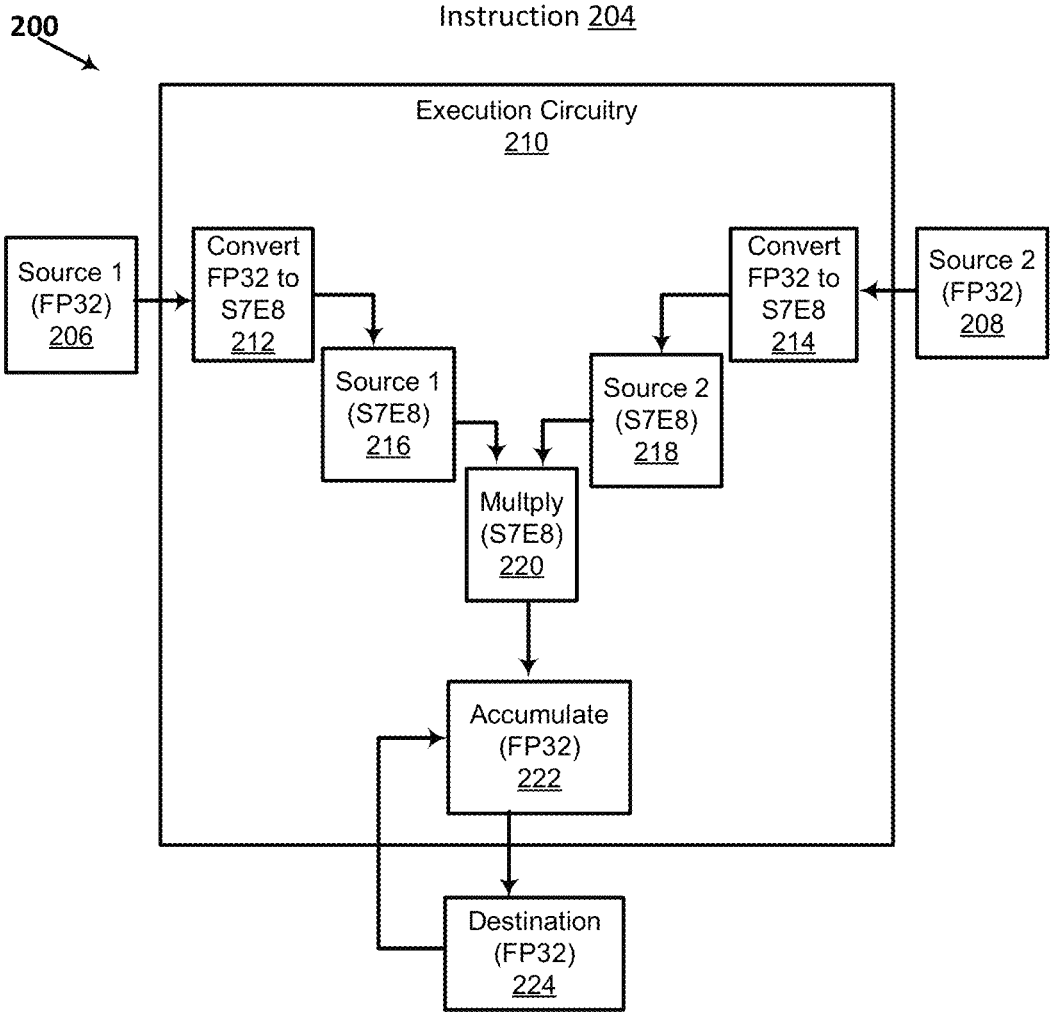
FIG. 2 is a block diagram illustrating processing components for executing a mixed-precision vector multiply-accumulate (MPVMAC) instruction, according to an embodiment.

FIG. 2 is a block diagram illustrating processing components for executing a mixed-precision vector multiply-accumulate (MPVMAC) instruction, according to an embodiment. As shown, computing system 200 is to execute instruction 202 to convert single-precision formatted vectors, source 1 (FP32) 206 and source 2 (FP32) 208, using FP32-to-FP16-57E8 converters 212 and 214, and to store the converted FP16-57E8-formatted source 1 and source 2 vector elements into neural half-precision FP16-S7E8-formatted registers, source 1 (FP16-S7E8) 216 and source 2 (FP16-S7E8) 218. Execution circuitry is then to execute instruction 204 to multiply each element of the two FP16-S7E8-formatted source vectors using 16-bit multiply circuitry 220. Each of the products generated by multiply circuitry 220 are then to be accumulated, using 32-bit accumulate (FP32) circuitry 222, with a previous value of a corresponding element of destination (FP32) 224.

As shown, instruction 202 is a VCVTPS2PNH (Vector ConVerT Packed Single-precision 2 Packed Neural Half-precision) instruction that specifies a 256-bit memory location or vector register destination, a 512-bit memory location or vector register source vector, and an 8-bit immediate to specify rounding behavior. A format of the VCVTPS2PNH instruction is further illustrated and described with respect to FIGS. 8, 9A-B, and 10A-D. Here, the VCVTPS2PNH instruction is to be called twice, each time specifying a 512-bit memory location as a source, and a 256-bit vector register as a destination.

As shown, instruction 204 is a VDPPNHS (Vector Dot Product Packed Neural Half-precision multiply Single-precision accumulate) instruction that specifies two 256-bit source vector registers or memory locations, and 512-bit destination vector register. Also specified is a mask, k1, the lowest-order 16 bits of which controls, when unmasked, each of the destination vector register elements is written with a new value. Also included is a {z} bit which specifies whether masked destination elements are to be zeroed or masked. A format of the VDPPNHS instruction is further illustrated and described with respect to FIGS. 8, 9A-B, and 10A-D. Here, instruction 204 specifies source 1 (FP16-S7E8) 216 and source 2 (FP16-S7E8) 218 as its source vectors, and destination (FP32) 224 as its destination.

Operation of computing system 200 to perform the (MPVMAC) instruction is further illustrated and described with respect to FIGS. 3, 5A-B, 12A-B, and 13A-B.

For the sake of simplicity, circuitry to perform the MPVMAC instruction is shown operating on a single data value. But, it should be understood that the illustrated sources and destination are vector quantities. In some embodiments, computing system 200 operates serially on elements of a vector. In some embodiments, computing system 200 operates in parallel on multiple elements of a vector. In other embodiments, computing system 200 operates on multiple elements of a matrix (tile), for example, a row or column of matrix (tile) elements. In some embodiments, computing system 200 utilizes SIMD (single instruction multiple data) circuitry to operate on multiple vector elements in parallel.

Figure 3:
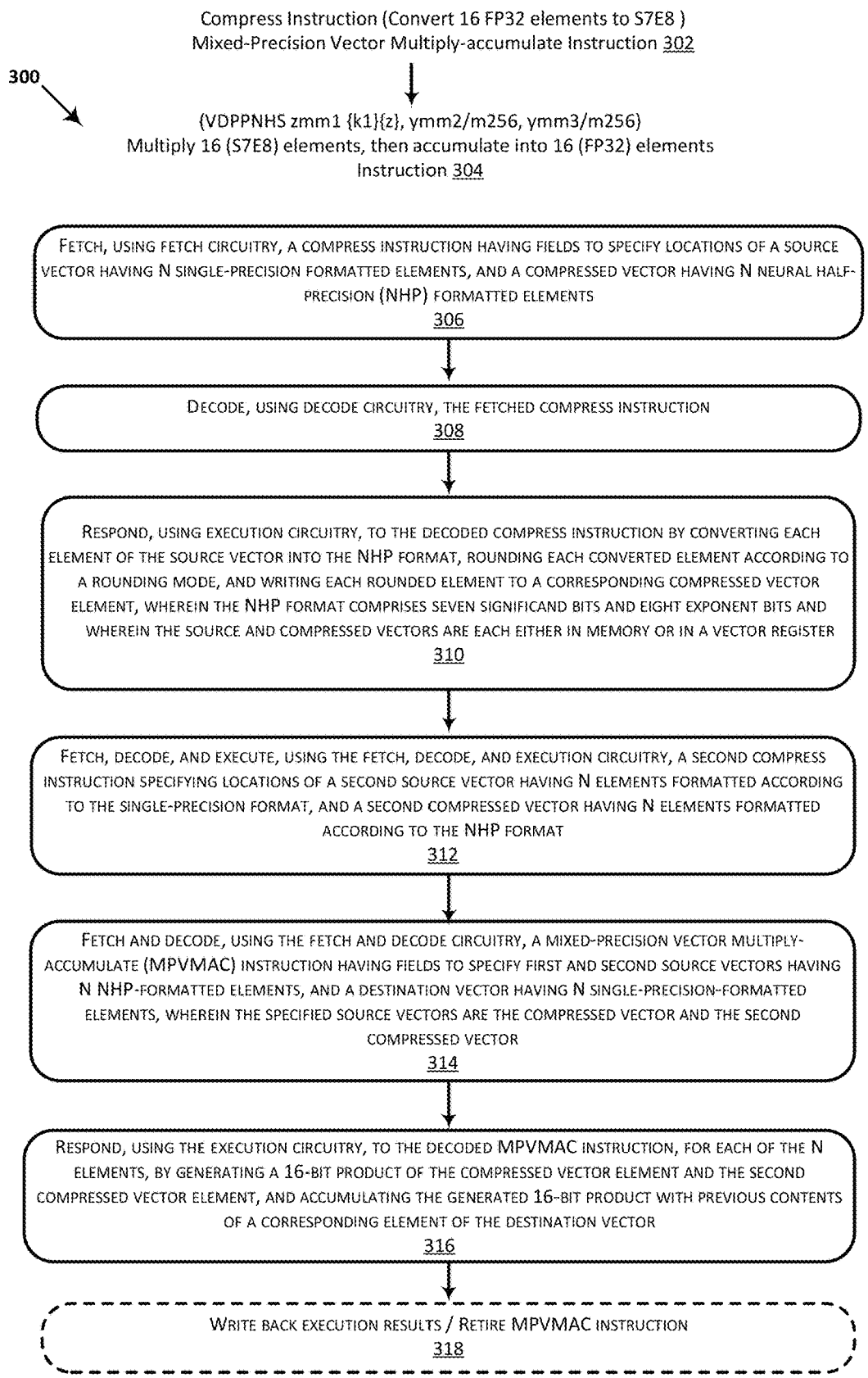
FIG. 3 is a block flow diagram illustrating a processor executing a mixed-precision vector multiply-accumulate (MPVMAC) instruction, according to an embodiment.

FIG. 3 is a block flow diagram illustrating a processor executing a mixed-precision vector multiply-accumulate (MPVMAC) instruction, according to an embodiment. As shown, processor performing flow 300 is to execute instruction 302 two times to convert two single-precision (FP32) source vectors into neural half-precision (NHP) vectors, and then execute mixed-precision vector multiply-accumulate (MPVMAC) instruction 304 to multiply each of the corresponding pairs of 16-bit elements, and then accumulate each product with a previous value of a corresponding FP32 destination using a 32-bit processing lane.

At 306, the processor is to fetch, using fetch circuitry, a compress instruction having fields to specify locations of a source vector having N single-precision formatted elements, and a compressed vector having N neural half-precision (NHP) formatted elements. At 308, the processor is to decode, using decode circuitry, the fetched compress instruction.

At 310, the processor is to respond, using execution circuitry, to the decoded compress instruction by: converting each element of the source vector into the NHP format, rounding each converted element according to a rounding mode, and writing each rounded element to a corresponding compressed vector element, wherein the NHP format comprises seven significand bits and eight exponent bits, and wherein the source and compressed vectors are each either in memory or in a vector register.

At 312, the processor is to fetch, decode, and execute, using the fetch, decode, and execution circuitry, a second compress instruction specifying locations of a second source vector having N elements formatted according to the single-precision format, and a second compressed vector having N elements formatted according to the NHP format.

At 314, the processor is to fetch and decode, using the fetch and decode circuitry, a MPVMAC instruction having fields to specify first and second source vectors having N NHP-formatted elements, and a destination vector having N single-precision-formatted elements, wherein the specified source vectors are the compressed vector and the second compressed vector.

At 316, the processor is to respond, using the execution circuitry, to the decoded MPVMAC instruction, for each of the N elements, by generating a 16-bit product of the compressed vector element and the second compressed vector element, and accumulating the generated 16-bit product with previous contents of a corresponding element of the destination vector.

In some embodiments, at 318, the processor is to write back execution results/retire the MPVMAC instruction. Operation 318 is optional, as indicated by its dashed border, insofar as the write back may occur at a different time, or not at all.

Operation of a processor to perform the (MPVMAC) instruction is further illustrated and described with respect to FIGS. 2, 5A-B, 12A-B, and 13A-B.

FIG. 4A illustrates floating-point formats used in conjunction with some disclosed embodiments. As shown, FP16-57E8 format 402 is used in conjunction with various disclosed embodiments, and consists of a sign bit, an 8-bit exponent, and a 7-bit significand (sometimes referred to as a mantissa, a coefficient, an argument, or a fraction). On the other hand, disclosed embodiments avoid using the IEEE 754 FP16 (S10E5) half-precision (sometimes referred to as binary16 or FP16-510E5) format 404, which consists of a sign bit, a 5-bit exponent, and a 10-bit significand. Disclosed embodiments avoid the IEEE binary16 format because it tends to fail to converge during training when results of individual scalar products within GEMM are not representable with the 5-bit exponent in IEEE half-precision—IEEE-FP16 (S10E5). Also shown is IEEE 754 single-precision (FP32/binary32) format 406. Disclosed embodiments use a 16-bit multiply stage to generate products of FP16-57E8 operands, and then accumulate the products with 32-bit lanes to generate the 32-bit FP32 result.

Figure 4B:
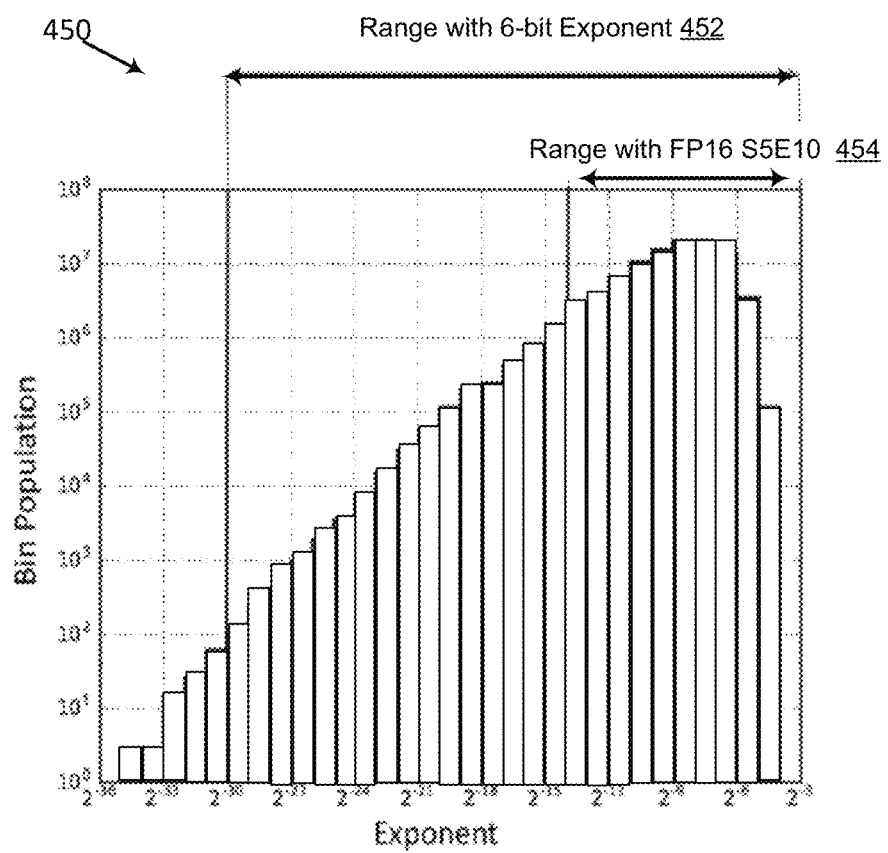
FIG. 4B illustrates the increased dynamic range of a neural half-precision (FP16-S7E8) floating-point format compared to a standard half-precision floating-point format.

FIG. 4B shows the proportion of these intermediate results (in CIFAR-10 training) which are not representable in IEEE half-precision (FP-16) but are with a 6-bit exponent. Histogram 450 shows that the range covered with the 6-bit exponent 452 is significantly larger than the range with IEEE-FP16 (S10E5) 454. This brings a significant benefit because training is unsuccessful with IEEE-FP16-510E5 but is successful with FP16-57E8.

As a large number of these scalar products are reduced to produce a single element of the matrix result, the precision of each individual scalar product result is less important, and so the number of bits in the significant can be safely reduced. As described in the below Experimental Results section, convergence for some neural networks can be achieved with multiplier inputs being reformatted from IEEE FP32 to a 16-bit format, such as FP16-57E8.

Figure 5A:
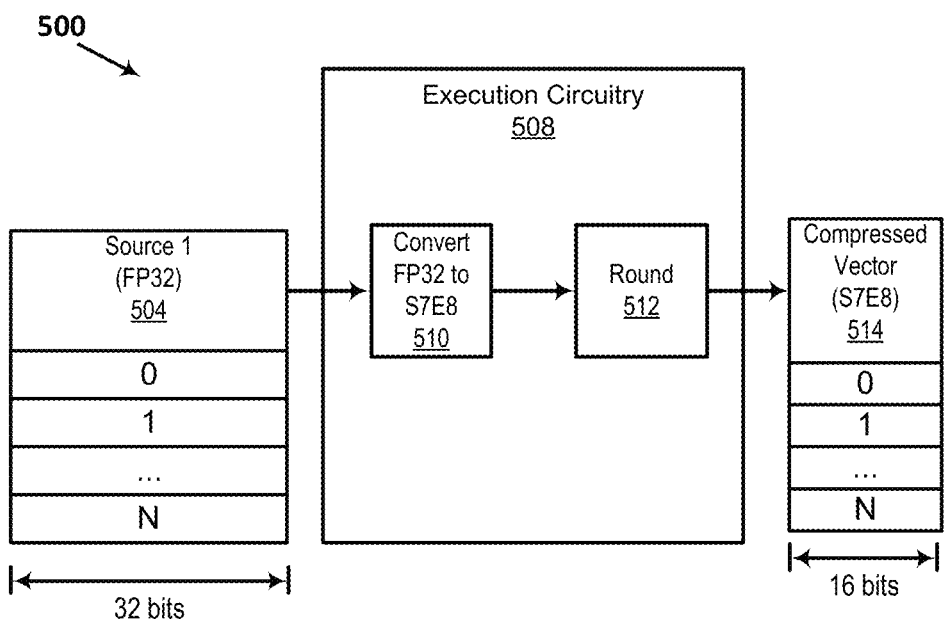
FIG. 5A is a block diagram illustrating execution of an instruction to convert formats from standard single-precision to neural half-precision, according to some embodiments.

FIG. 5A is a block diagram illustrating execution of an instruction to convert formats from standard single-precision to neural half-precision, according to some embodiments. As shown, computing system 500 is to execute instruction 502 to convert a single-precision formatted vector, source 1 (FP32) 504, using FP32-to-FP16-57E8 converters 510 and rounding circuitry 512, to generate and store 16 neural half-precision (NHP) formatted values to compressed vector (FP16-57E8) 514.

As shown, instruction 502 is a VCVTPS2PNH (Vector ConVerT Packed Single-precision 2 Packed Neural Half-precision) instruction that specifies a 256-bit memory location or vector register destination, a 512-bit memory location or vector register source vector, and an 8-bit immediate to specify rounding behavior. A format of the VCVTPS2PNH instruction is further illustrated and described with respect to FIGS. 8, 9A-B, and 10A-D.

In operation, computing system 500 is to convert each of the elements of source 1 (FP32) 504, using execution circuitry 508, which includes FP32 to FP16-57E8 converters 510 and rounding circuitry 512, and to store each of the converted elements to a corresponding element of compressed vector (FP16-57E8) 514. Operation of computing system 500 to perform the (MPVMAC) instruction is further illustrated and described with respect to FIGS. 5B, 12A-B, and 13A-B.

Figure 5B:
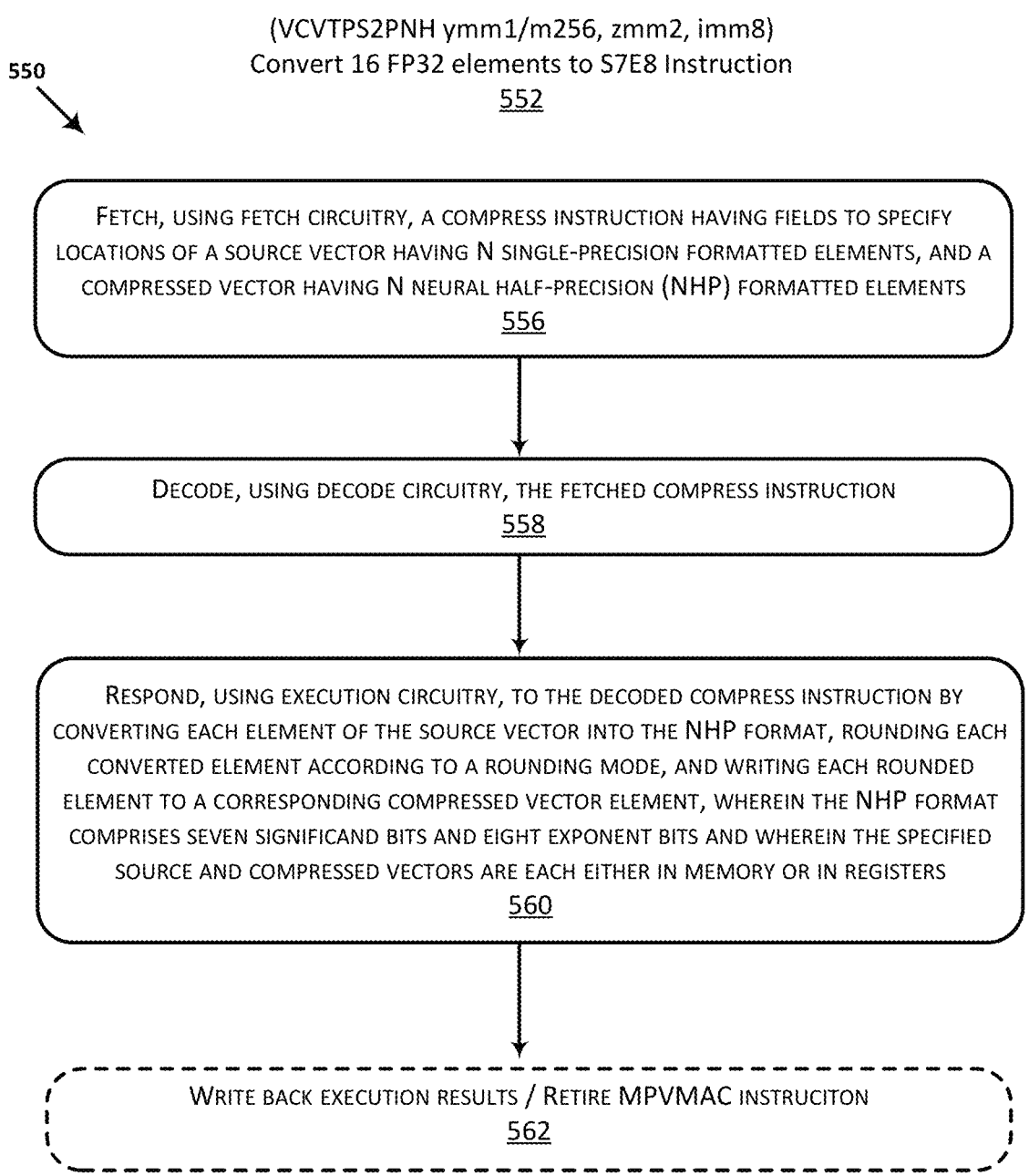
FIG. 5B is a block flow diagram illustrating an embodiment of a processor executing an instruction to convert formats from standard single-precision to neural half-precision.

FIG. 5B is a block flow diagram illustrating an embodiment of a processor executing an instruction to convert formats from standard single-precision to neural half-precision. As shown, flow 550 is to be executed by a processor to execute instruction 552 to convert a single-precision (FP32) source vector into a neural half-precision (NHP) vector.

At 556, the processor is to fetch, using fetch circuitry, a compress instruction having fields to specify locations of a source vector having N single-precision formatted elements, and a compressed vector having N neural half-precision (NHP) formatted elements. At 558, the processor is to decode, using decode circuitry, the fetched compress instruction.

At 560, the processor is to respond, using execution circuitry, to the decoded compress instruction by converting each element of the source vector into the NHP format, rounding each converted element according to a rounding mode, and writing each rounded element to a corresponding compressed vector element, wherein the NHP format comprises seven significand bits and eight exponent bits and wherein the specified source and compressed vectors are each either in memory or in registers.

In some embodiments, at 562, the processor is to write back execution results/retire the MPVMAC instruction. Operation 562 is optional, as indicated by its dashed border, insofar as the write back may occur at a different time, or not at all.

Figure 6A:
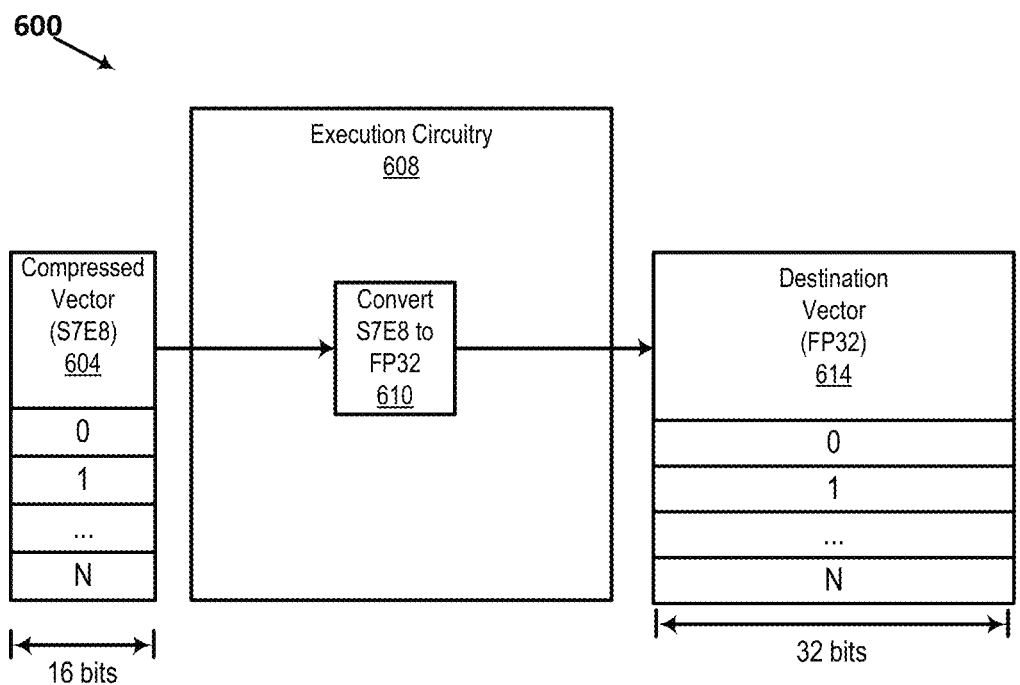
FIG. 6A is a block diagram illustrating execution of an instruction to convert formats from neural half-precision to standard single-precision, according to some embodiments.

FIG. 6A is a block diagram illustrating execution of an instruction to convert formats from neural half-precision to standard single-precision, according to some embodiments. As shown, computing system 600 is to execute instruction 602 to convert a neural half-precision formatted vector, source 1 (FP16-57E8) 604, using FP16-57E8 to FP32 converters 610 to generate and store 16 single-precision (FP32) formatted values to destination vector (FP32) 614.

As shown, instruction 602 is a VCVTPNH2PS (Vector ConVerT Packed Neural Half-precision 2 Packed Single-precision) instruction that specifies a 512-bit memory location or vector register destination, and a 256-bit memory location or vector register source vector. A format of the VCVTPNH2PS instruction is further illustrated and described with respect to FIGS. 8, 9A-B, and 10A-D.

In operation, computing system 600 is to convert each of the elements of source 1 (FP16-57E8) 604, using execution circuitry 608, which includes FP16-57E8 to FP32 converters 610, to store each of the converted elements to a corresponding element of destination vector (FP32) 614. Operation of computing system 600 to perform the (MPVMAC) instruction is further illustrated and described with respect to FIGS. 6B, 12A-B, and 13A-B.

FIG. 6B is a block flow diagram illustrating an embodiment of a processor executing an instruction to convert formats from neural half-precision to standard single-precision. As shown, flow 650 is to be executed by a processor to execute instruction 652 to convert a neural half-precision (NHP) source vector into a single-precision (FP32) vector.

At 656, the processor is to fetch, using fetch circuitry, an expand instruction having fields to specify locations of a compressed source vector having N neural half-precision (NHP) formatted elements, and a destination vector having N single-precision formatted elements. At 658, the processor is to decode, using decode circuitry, the fetched expand instruction.

At 660, the processor is to respond, using execution circuitry, to the decoded expand instruction by converting each element of the compressed source vector into the single-precision format, and writing each converted element to a corresponding destination vector element.

In some embodiments, at 662, the processor is to write back execution results/retire the MPVMAC instruction.

Operation 662 is optional, as indicated by its dashed border, insofar as the write back may occur at a different time, or not at all.

Experimental Results

Disclosed embodiments using a FP16-57E8 reduced-precision data format are expected to improve performance and efficiency of a processor performing a mixed-precision vector multiply-accumulate (MPVMAC) instruction as part of a machine learning workload, as was confirmed by experimental results described below. As described below, experiments were conducted according to a methodology illustrated and described with respect to FIG. 7A. FIG. 7B shows that attempting to train on a CIFAR-10 dataset of images fails to converge when a 16-bit format with a 5-bit exponent, such as IEEE-FP16 (S10E5), is used, while FIG. 7C shows that the convergence is achieved using the same setup but with a 6-bit exponent. Given that experiments show convergence is achieved using a 6-bit exponent, using an 8-bit exponent, for example as the FP16-57E8 format of disclosed embodiments, is conservatively expected to achieve convergence. FIG. 7D and FIG. 7E show experimental results on an AlexNet neural network and a Resnet-50 neural network, respectively, showing improved convergence when using FP16-57E8 format of disclosed embodiments, as compared to the performance of the IEEE-FP16 (S10E5) format.

Experiment Methodology

Figure 7A:
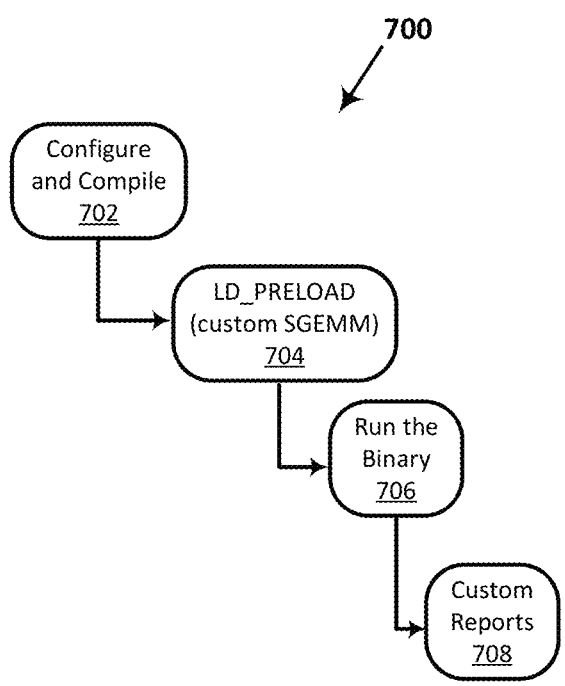
FIG. 7A is a flow diagram for conducting a machine learning experiment using a mixed-precision vector multiply-accumulate (MPVMAC) instruction, according to some embodiments.
Figure 7B:
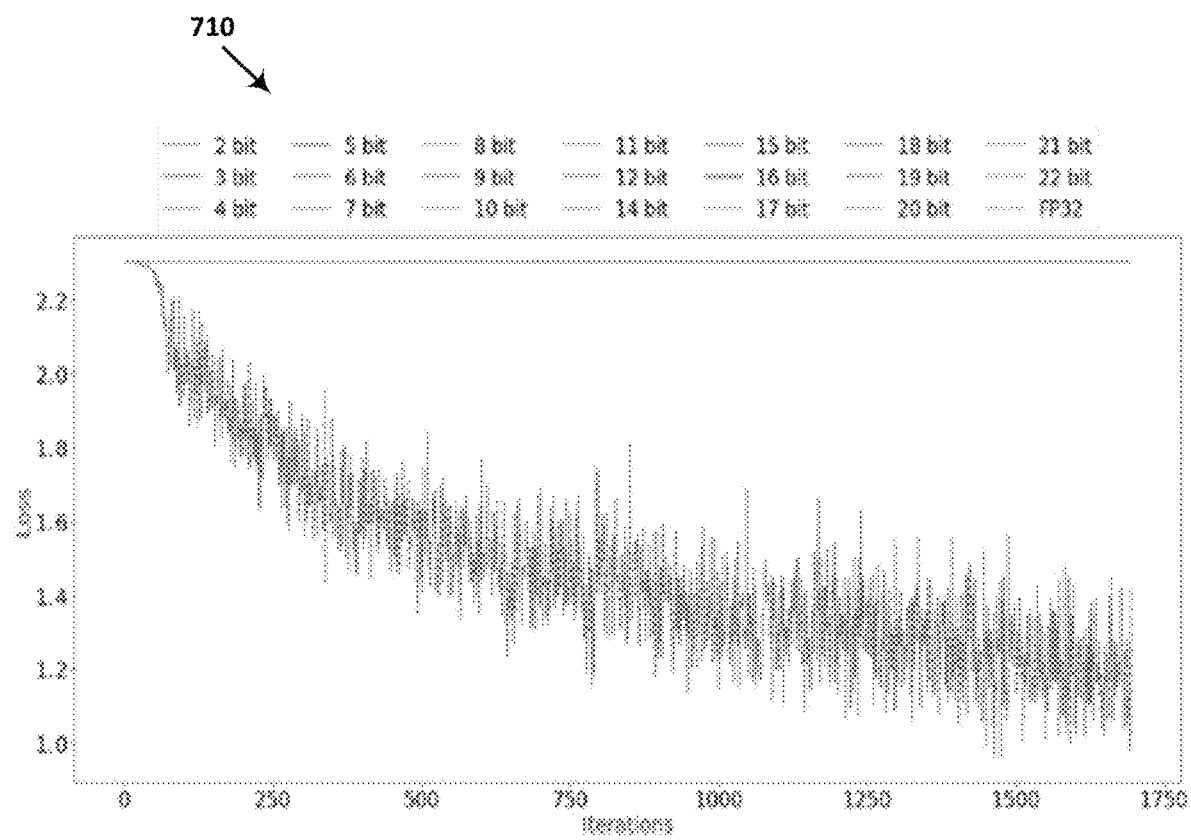
FIG. 7B illustrates experimental results relating to non-convergence of CIFAR-10 using 5-bit exponent for multiplier and accumulation in FP32.
Figure 7C:
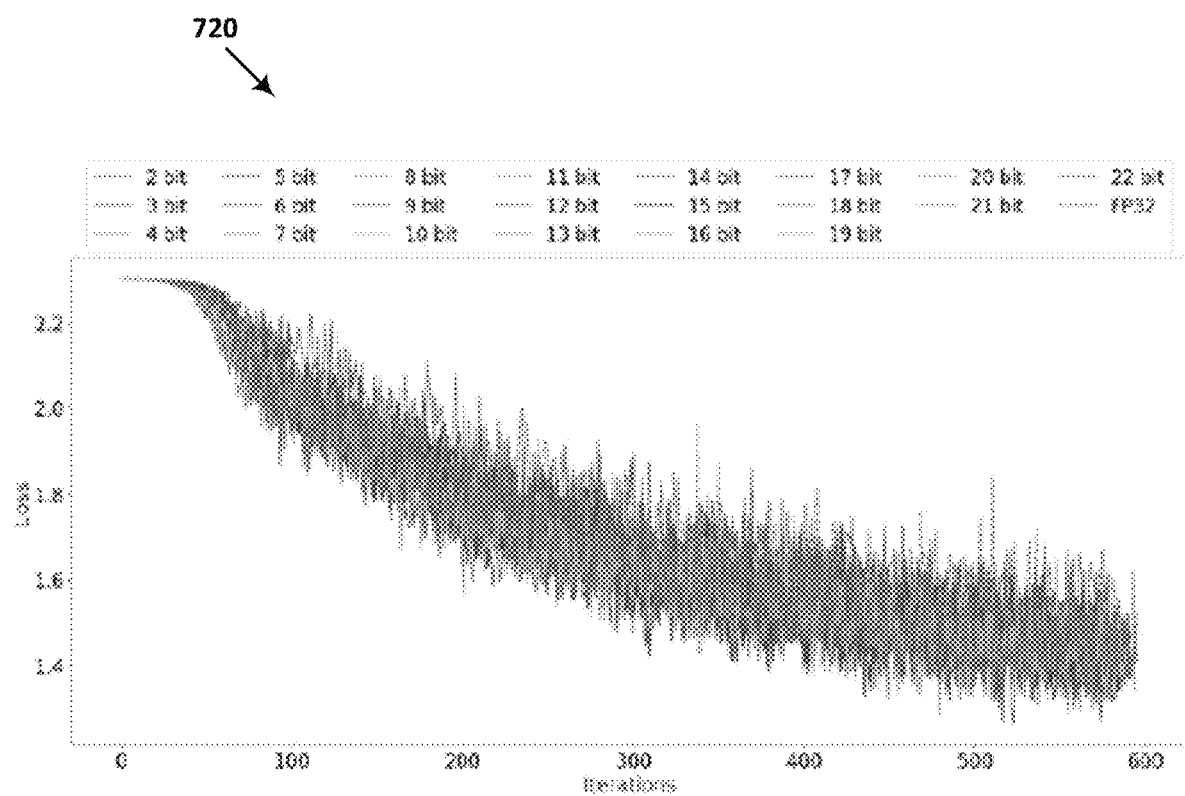
FIG. 7C illustrates experimental results relating to convergence of CIFAR-10 using 6-bit exponent and a parameter sweep for the number of bits in mantissa, FP32 accumulation.
Figure 7D:
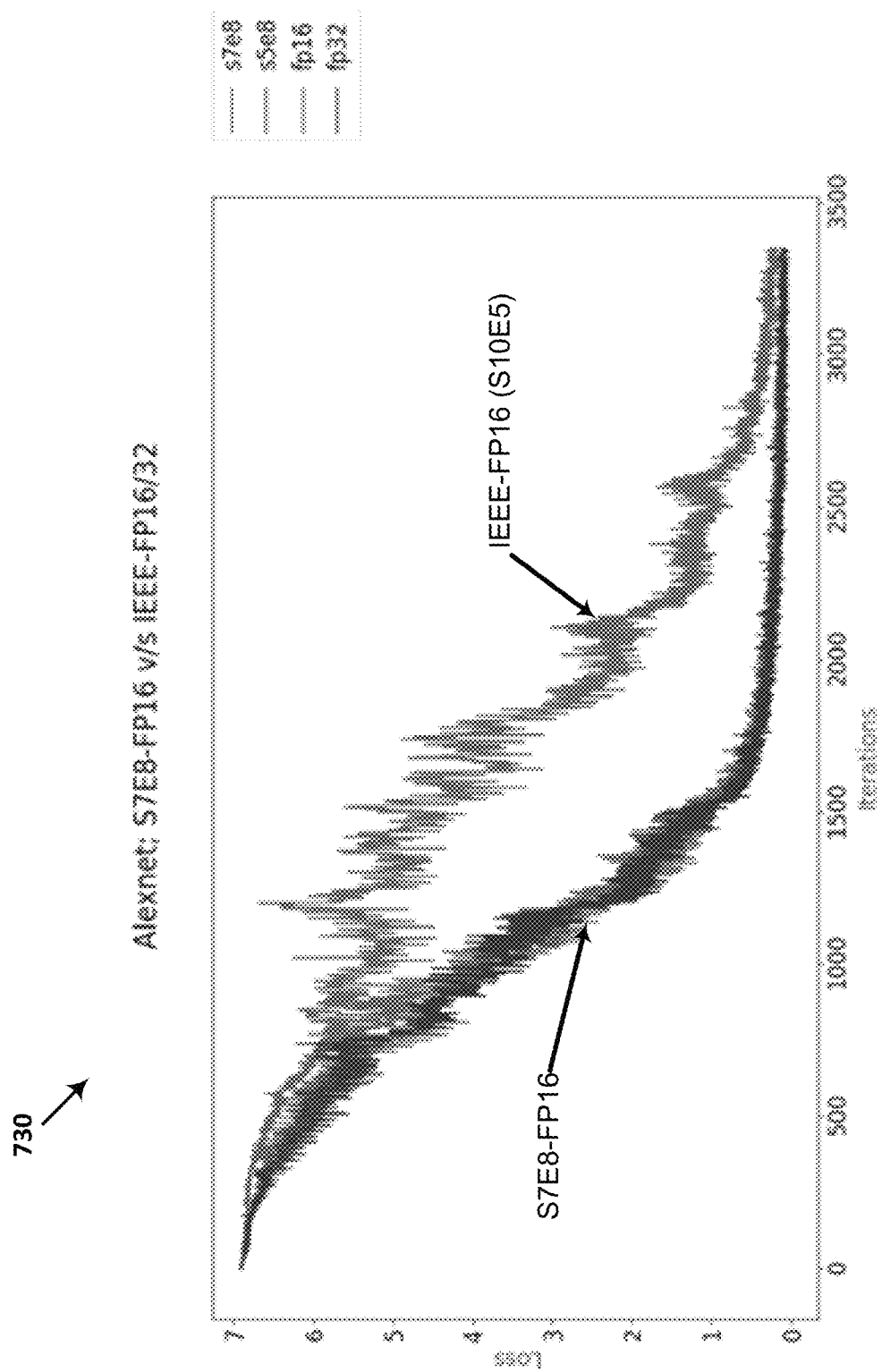
FIG. 7D illustrates experimental results relating to Convergence of AlexNet with a multiplier implemented using IEEE-FP16 (S10E5) and FP16-57E8 representations and the accumulator implemented using FP32.
Figure 7E:
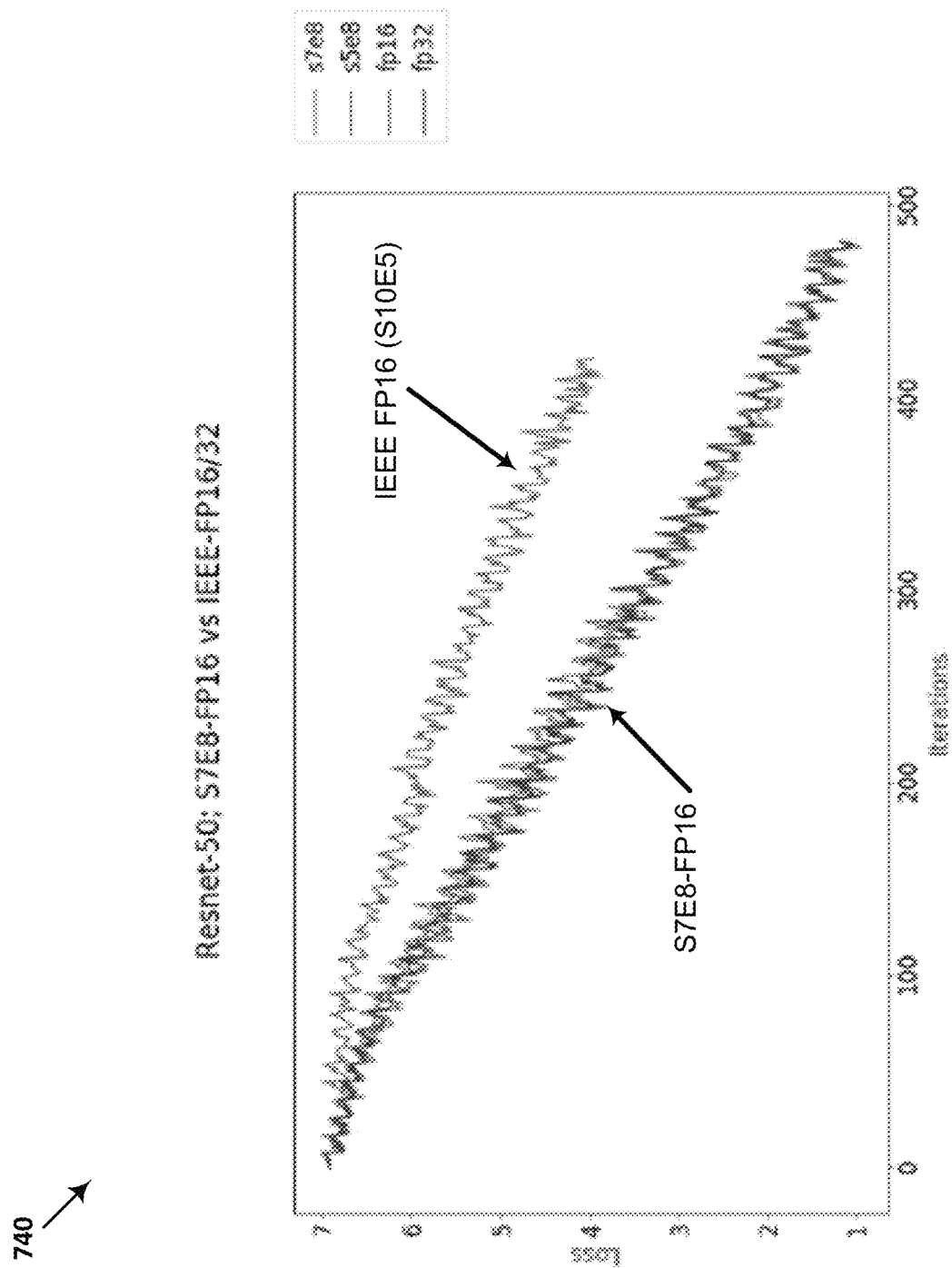
FIG. 7E illustrates a convergence graph for Resnet-50; FP16-57E8 vs IEEE-FP16/32.

FIG. 7A is a flow diagram illustrating a methodology applied for conducting machine learning experiments. Using experimental method 700, experimental reports are generated by performing the training runs of various Neural Networks using a CAFFE (Convolutional Architecture for Fast Feature Embedding) deep learning framework. CAFFE supports many different types of deep learning architectures geared towards image classification and image segmentation.

As shown, the neural network testbench is configured and compiled at 702. At 704, a custom SGEMM is installed. (GEMM—GEneral Matrix Multiplication—is a common function in deep learning and is part of the BLAS—Basic Linear Algebra Subprograms—library. SGEMM and DGEMM are single-precision and double-precision versions of GEMM, respectively). In conducting the experiments, SGEMM calls are to be intercepted and replaced with a custom SGEMM to vary the precision of multipliers and accumulators using a custom tool called "BLAS Interceptor" without any changes to the binary.

At 706, the binary is run with low precision arithmetic being performed using the GNU MPFR library for CIFAR-10 (CIFAR-10 is an established computer-vision dataset used for object recognition, which can contain tens of thousands of 32×32 color images) and Intrinsics with rounding to zero for AlexNet and ResNet.

At 708, custom reports are generated.

Non-Convergence of CIFAR-10 Using 5-Bit Exponent for Multiplier and Accumulation in FP32

FIG. 7B illustrates experimental results relating to non-convergence of CIFAR-10 using 5-bit exponent for multiplier and accumulation in FP32. As shown, the convergence graph 710 illustrates CIFAR-10 with an SGEMM implementation having a multiplier with κ bit-exponent and an FP32 accumulator. It can be seen that the network does not converge with 5-bit exponent used for the multiplier, irrespective of the number of bits in mantissa. The loss remains stagnant (~2.3) for all the mantissa bits.

This can be seen in the histogram of FIG. 4B; namely, a FP16-S10E5 format, with 5 bits of exponent, has a significantly narrow convergence range than a FP16 (S7E8). Thus, the IEEE-FP16 (S10E5) format, which mandates 5 bits in exponent and 10 bits for the mantissa, would fail to converge as would a drop-in replacement of a SGEMM multiplier implemented in the IEEE-FP16 (S10E5) semantics will lead to a failure in convergence and prompt the user to perform hyper-parameter tuning to compensate for this.

In some embodiments, on the other hand, a multiplier implemented according to the disclosed FP16-S7E8 format can be a drop-in replacement. In such embodiments, a FP16-S7E8 multiplier serves as a drop-in replacement, for example by linking SGEMM software running in a machine learning context to a different library, one that instructs the hardware to perform 16-bit multiplications according to the FP16 S7E8 format, and accumulates the results according to the FP32 format. Such a drop-in replacement will benefit the processor in terms of consuming less power, improving performance on account of the narrower multiplies, improving instruction throughput, and easing register and memory pressure by reducing the size of data elements being transferred. Similarly, in some embodiments, a FP16 S7E8 serves as a drop in replacement for SGEMM multipliers implemented according to any other 16-bit or 32-bit format, for example by linking the SGEMM software to a different, FP16 S7E8-enabled library of function calls. In some embodiments, the FP16 S7E8 library is linked as a drop-in replacement for SGEMM multipliers without involvement by the operating system or any other software running on the processor. In some embodiments, the FP15 S7E8 library is dynamically linked, in response for example to a need to reduce power consumption or to increase instruction throughput, as a drop-in replacement for SGEMM multipliers.

Convergence of CIFAR-10 with 6-Bit Exponent Multiply and FP32 Accumulator

FIG. 7C illustrates experimental results relating to convergence of CIFAR-10 using 6-bit exponent and a parameter sweep for the number of bits in mantissa, FP32 accumulation. As shown, convergence graph 720 results after the number of bits in the exponent is extended to 6 and the same experiment as used for FIG. 7B is used. The SGEMM implementation in this case consists of the multiplier implemented using a 6-bit exponent (and a parameter sweep for the number of bits in the mantissa) and accumulator implemented using FP32 semantics.

As shown, CIFAR-10 converges and matches FP32 behavior with 6 bits exponent, with the number of bits in mantissa being greater than two for the multiplication and the accumulation performed in FP32. Convergence chart 720 of FIG. 7C captures the convergence behavior.

The histogram of the scalar products seen in FIG. 4B again provides the underpinning reasoning, extension of the exponent by 1 increases the range of numbers that can be represented by the multiplier, and successfully represents all the products.

Hence, extending the exponent and implementing the multiplier in lower precision (with FP32 accumulator) in SGEMM allows a drop-in replacement on Neural Networks like CIFAR-10 with hyper-parameters tuned for FP32.

AlexNet and ResNet50 Convergence with FP16-S7E8, IEEE-FP16 (S10E5) and FP32

The above experiment can be expended to cover bigger networks. The multipliers in SGEMM using IEEE-FP16 S10E5 (10-bit mantissa, 5-bit exponent) and FP16-S7E8 (7 bits mantissa and 8 bits exponents) were implemented using Intrinsics. The Intrinsics implementation exactly matched the MPFR implementation.

AlexNet

AlexNet was the first big Neural Network that won the ILSVRC (ImageNet Large Scale Visual Recognition) competition and widely used in Computer Vision tasks. FIG. 7D includes experimental results relating to convergence of AlexNet with multiplier implemented using IEEE-FP16 (S10E5) and FP16-S7E8 representations and the accumulator implemented using FP32, and illustrates the convergence graph 730 for AlexNet with SGEMM using lower precision multiply. Convergence graph 730 shows that FP16-S7E8 representation yields better convergence results than IEEE-FP16 (S10E5), which takes a significantly higher number of iterations to achieve similar convergence. Though not shown, the experimental results for AlexNet showed that convergence using FP16-S7E8 for the multiplier yielded convergence performance comparable to that using FP32 for the multiplier.

RES-NET 50

FIG. 7E illustrates convergence graph 740 for Resnet-50; FP16-S7E8 vs IEEE-FP16/32. ResNet-50 is one of the big Neural Network implementations with 50 layers that was used in the ILSVRC challenge recently. The convergence behavior of ResNet-50 with lower precision SGEMM is as seen in FIG. 7E. It can be seen that it follows the behavior that was observed for AlexNet. The SGEMM with multipliers using FP16-S7E8 traces the convergence pattern of FP32. IEEE-FP16 (S10E5) requires a higher number of iterations to converge. Though not shown, the experimental results for Resnet-50 showed that convergence using FP16-S7E8 for the multiplier yielded convergence performance comparable to that using FP32 for the multiplier.

Figure 8:
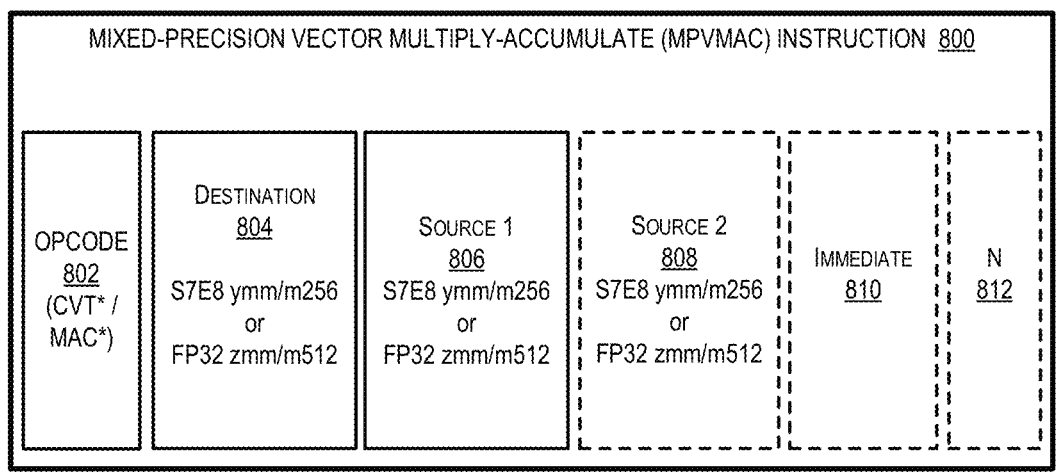
FIG. 8 is a format of a mixed-precision vector multiply-accumulate (MPVMAC) instruction, according to some embodiments.

FIG. 8 is a format of a mixed-precision vector multiply-accumulate (MPVMAC) instruction, according to some embodiments. As shown, MPVMAC instruction 800 includes fields to specify an opcode 802 (here, either convert or multiply-accumulate), a destination vector 804, and a source vector, source 1 806. The specified source and destination vectors are either, when single-precision (FP32) formatted, a 512-bit memory location or vector register, otherwise, when neural half-precision (NHP or FP16-S7E8) formatted, a 356-bit memory location or vector register.

Some embodiments also include one or more additional fields to specify a second source, source 2 808, an 8-bit immediate 810, and the number, N 812, of elements in the source and destination vectors. The one or more additional fields are optional, as indicated by their dashed borders, insofar as they might not be included in the instruction, or the behavior they would control is instead controlled via a software-programmable control register.

The format of MPVMAC instruction 800 is further illustrated and described with respect to FIGS. 9A-B and FIGS. 10A-D.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
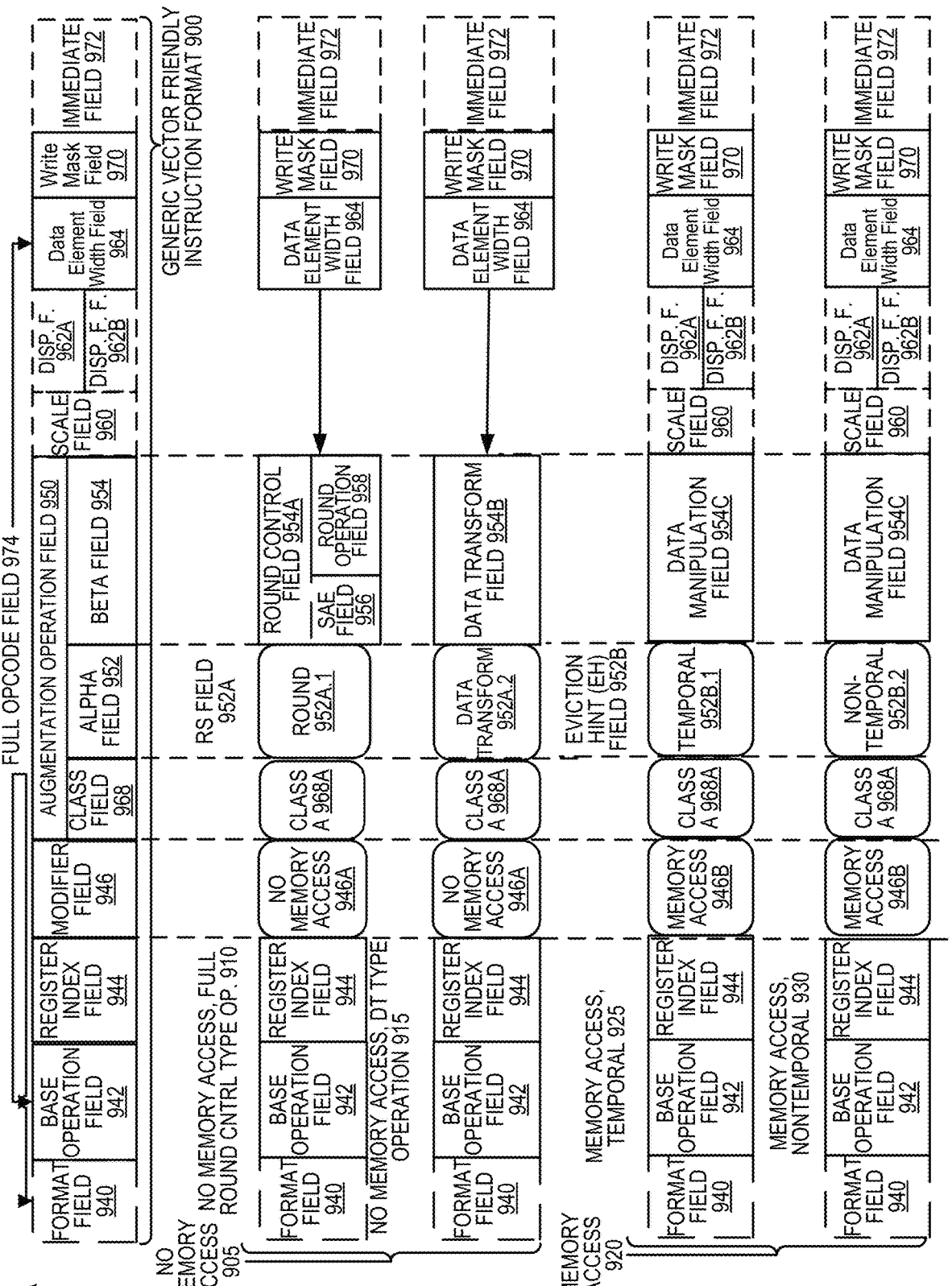
FIGS. 9A-9B are block diagrams illustrating a generic vector friendly instruction format and instruction templates thereof according to some embodiments of the invention.
Figure 9B:
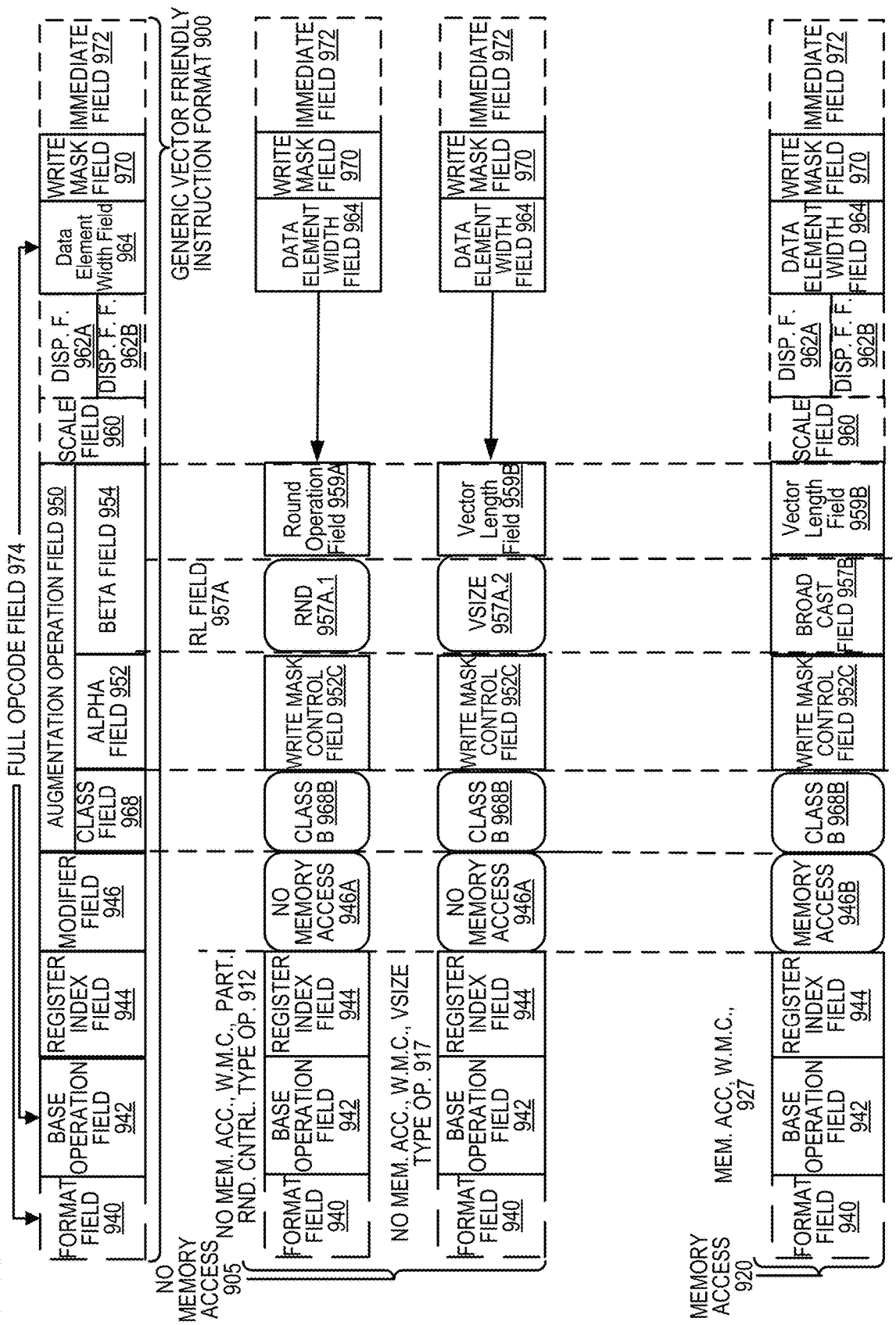

FIGS. 9A-9B are block diagrams illustrating a generic vector friendly instruction format and instruction templates thereof according to some embodiments of the invention. FIG. 9A is a block diagram illustrating a generic vector friendly instruction format and class A instruction templates thereof according to some embodiments of the invention; while FIG. 9B is a block diagram illustrating the generic vector friendly instruction format and class B instruction templates thereof according to some embodiments of the invention. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32-bit (4 byte) or 64-bit (8 byte) data element widths (or sizes) (and thus, a 64 byte vector consists of either 16 doubleword-size elements or alternatively, 8 quadword-size elements); a 64 byte vector operand length (or size) with 16-bit (2 byte) or 8-bit (1 byte) data element widths (or sizes); a 32 byte vector operand length (or size) with 32-bit (4 byte), 64-bit (8 byte), 16-bit (2 byte), or 8-bit (1 byte) data element widths (or sizes); and a 16 byte vector operand length (or size) with 32-bit (4 byte), 64-bit (8 byte), 16-bit (2 byte), or 8-bit (1 byte) data element widths (or sizes); alternative embodiments may support more, less and/or different vector operand sizes (e.g., 256 byte vector operands) with more, less, or different data element widths (e.g., 128-bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In some embodiments, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*index+base$).

Displacement Field 962A—its content is used as part of memory address generation (e.g., for address generation that uses $2^{scale}*index+base+displacement$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the invention are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the invention the round control field 954A includes a suppress all floating-point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating-point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In some embodiments where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating-point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In some embodiments where a processor includes a control register for specifying rounding modes, the round operation control field's 950 content overrides that register value.

In the no memory access, write mask control, VSIZE type operation 917 instruction templates, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10A is a block diagram illustrating an exemplary specific vector friendly instruction format according to some embodiments of the invention. FIG. 10A shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10A map are illustrated.

It should be understood that, although embodiments of the invention are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one-bit field in the specific vector friendly instruction format 1000, the invention is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in some embodiments).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1010A—this is the first part of the REX' field 1010 and is the EVEX.R' bit field (EVEX Byte 1, bit [4]—R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0; if EVEX.U=1, it indicates class B or EVEX.U1.

Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 1010B—this is the remainder of the REX' field 1010 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand or be treated as an opcode extension and not used to encode any instruction operand. The role of R/M field 1046 may include the following: encoding the instruction operand that references a memory address or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64-byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to some embodiments. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to some embodiments. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
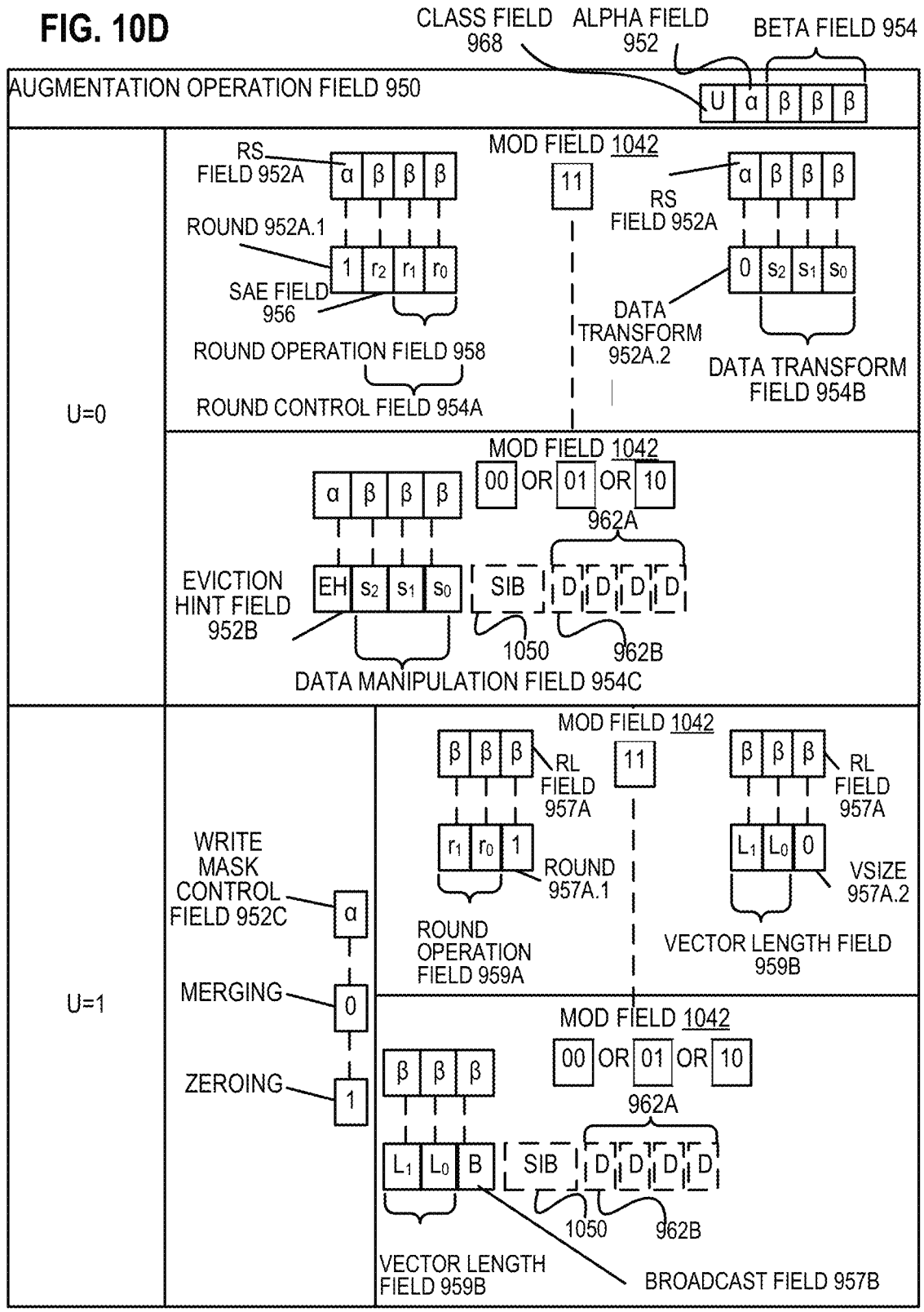
FIG. 10D is a block diagram illustrating the fields of the specific vector friendly instruction format that make up the augmentation operation field according to one embodiment.

FIG. 10D is a block diagram illustrating the fields of the specific vector friendly instruction format 1000 that make up the augmentation operation field 950 according to some embodiments. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one-bit SAE field 956 and a two-bit round operation field 958. When the rs field 952A contains a 0 (data transform 952A.2), the beta field 954 (EVEX byte 3, bits [6:4]—SSS) is interpreted as a three-bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—$S_0$) is interpreted as the RL field 957A; when it contains a 1 (round 957A.1) the rest of the beta field 954 (EVEX byte 3, bit [6-5]—$S_{2-1}$) is interpreted as the round operation field 959A, while when the RL field 957A contains a 0 (VSIZE 957.A2) the rest of the beta field 954 (EVEX byte 3, bit [6-5]—$S_{2-1}$) is interpreted as the vector length field 959B (EVEX byte 3, bit [6-5]—$L_{1-0}$). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—$L_{1-0}$) and the broadcast field 957B (EVEX byte 3, bit [4]—B).

Exemplary Register Architecture

Figure 11:
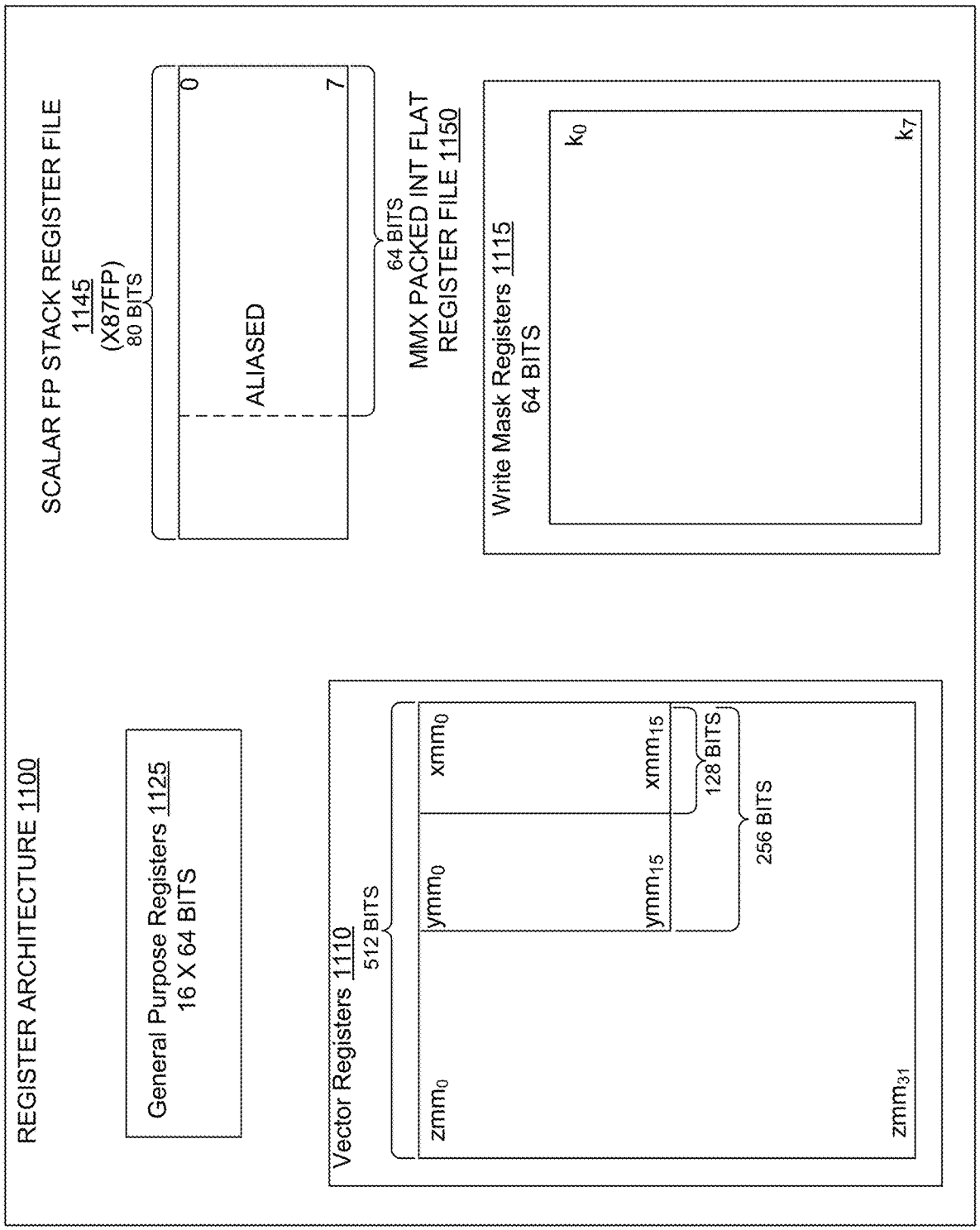
FIG. 11 is a block diagram of a register architecture according to one embodiment.

FIG. 11 is a block diagram of a register architecture 1100 according to some embodiments. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A; U = 0) | 910, 915, 925, 930 | zmm registers (the vector length is 64 byte) |
|  | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64-byte, 32 bytes, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating-point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 1145, on which is aliased the MMX packed integer flat register file 1150—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to some embodiments of the invention. FIG. 12B is a block diagram illustrating both an exemplary embodiment of an in-order architecture core and an exemplary register renaming, out-of-order issue/execution architecture core to be included in a processor according to some embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front-end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front-end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front-end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general-purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 13B:
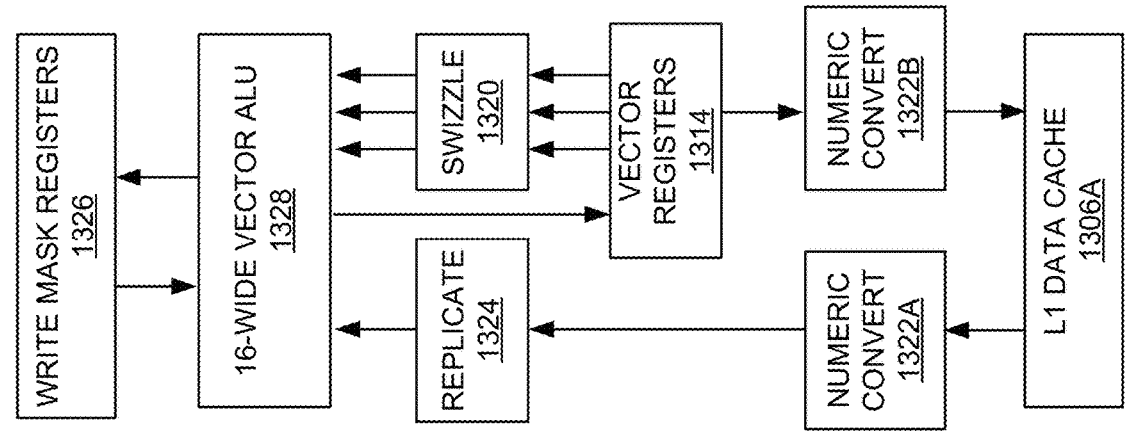
FIGS. 13A-B illustrate a block diagram of a more specific exemplary in-order core architecture, which core would be one of several logic blocks (including other cores of the same type and/or different types) in a chip.
Figure 13A:
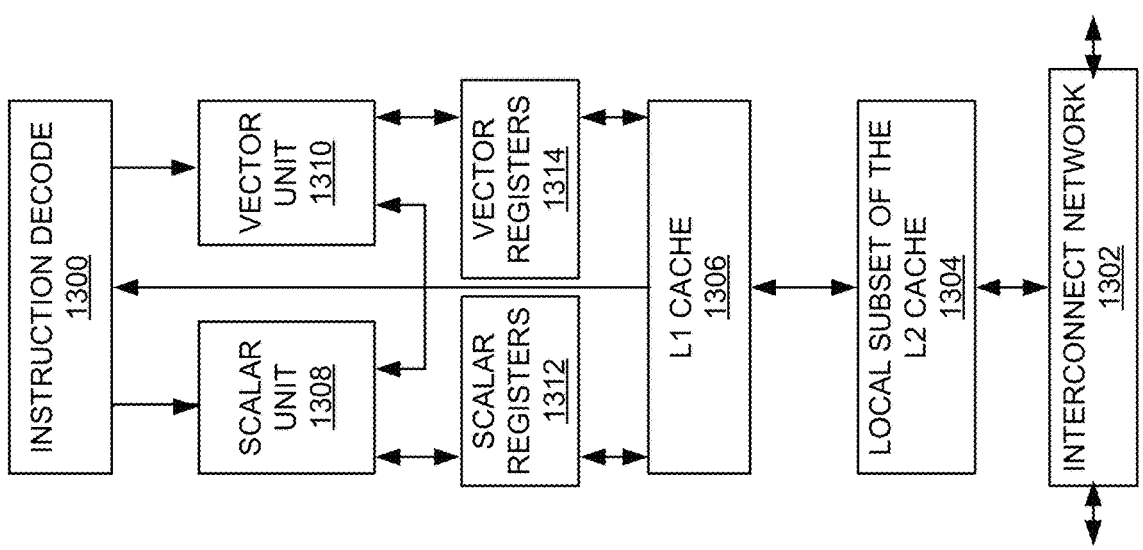

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to some embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to some embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
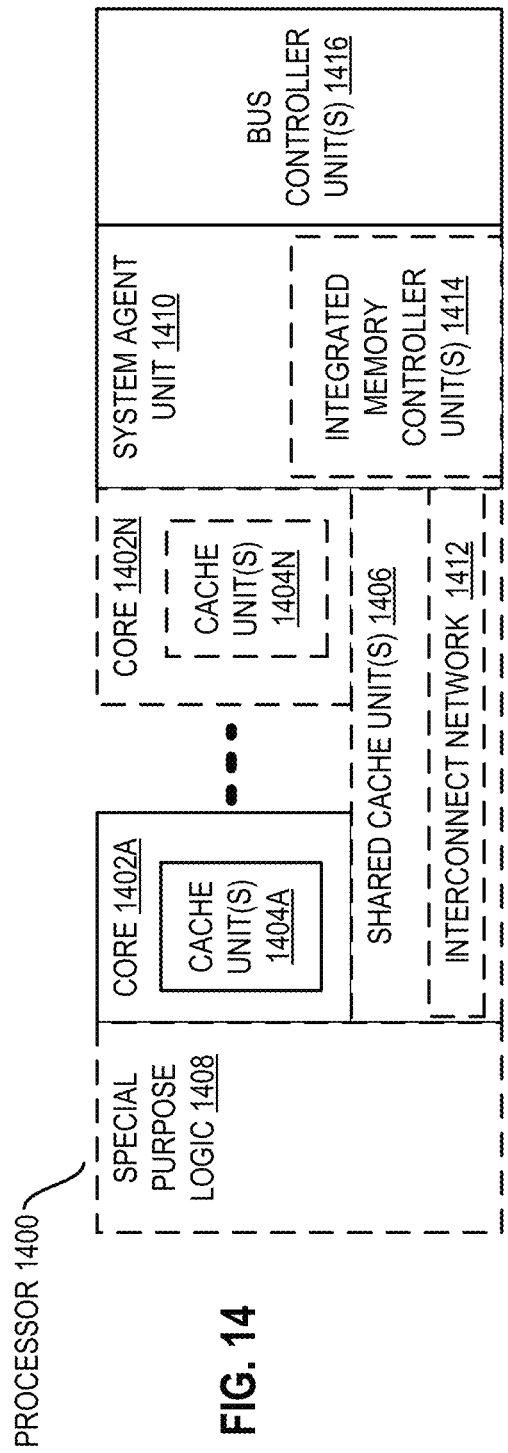
FIG. 14 is a block diagram of a processor that may have more than one core, may have an integrated memory controller, and may have integrated graphics according to some embodiments.

FIG. 14 is a block diagram of a processor 1400 that may have more than one core, may have an integrated memory controller, and may have integrated graphics according to some embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
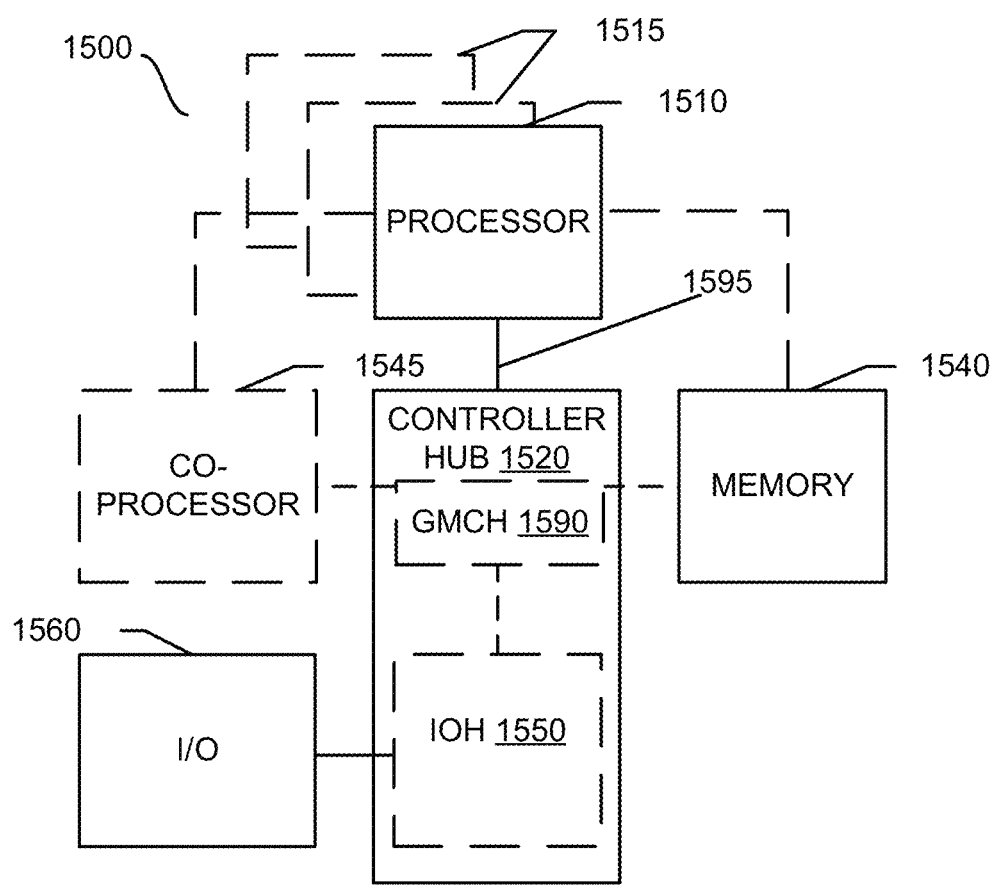
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random-access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
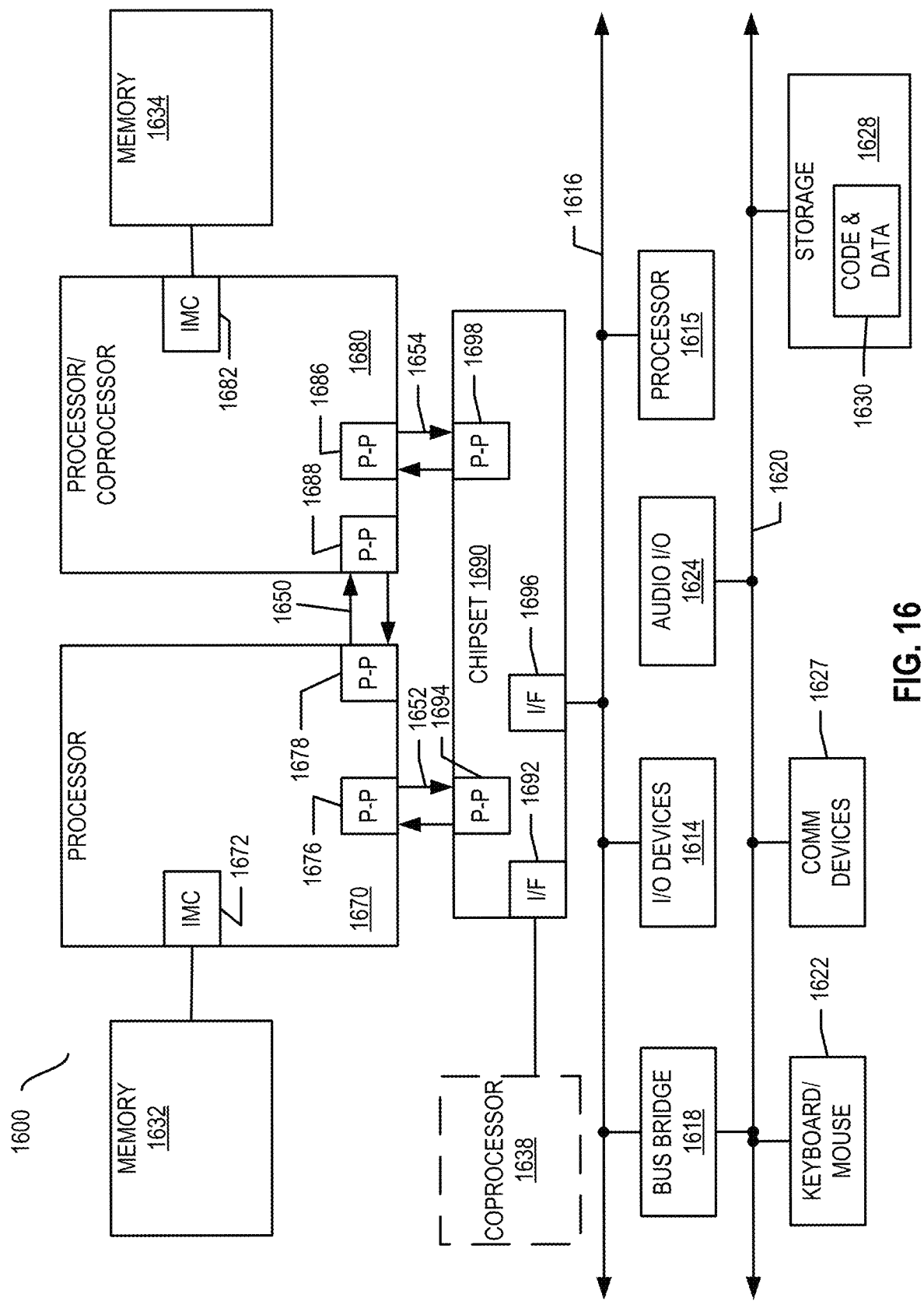

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In some embodiments, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
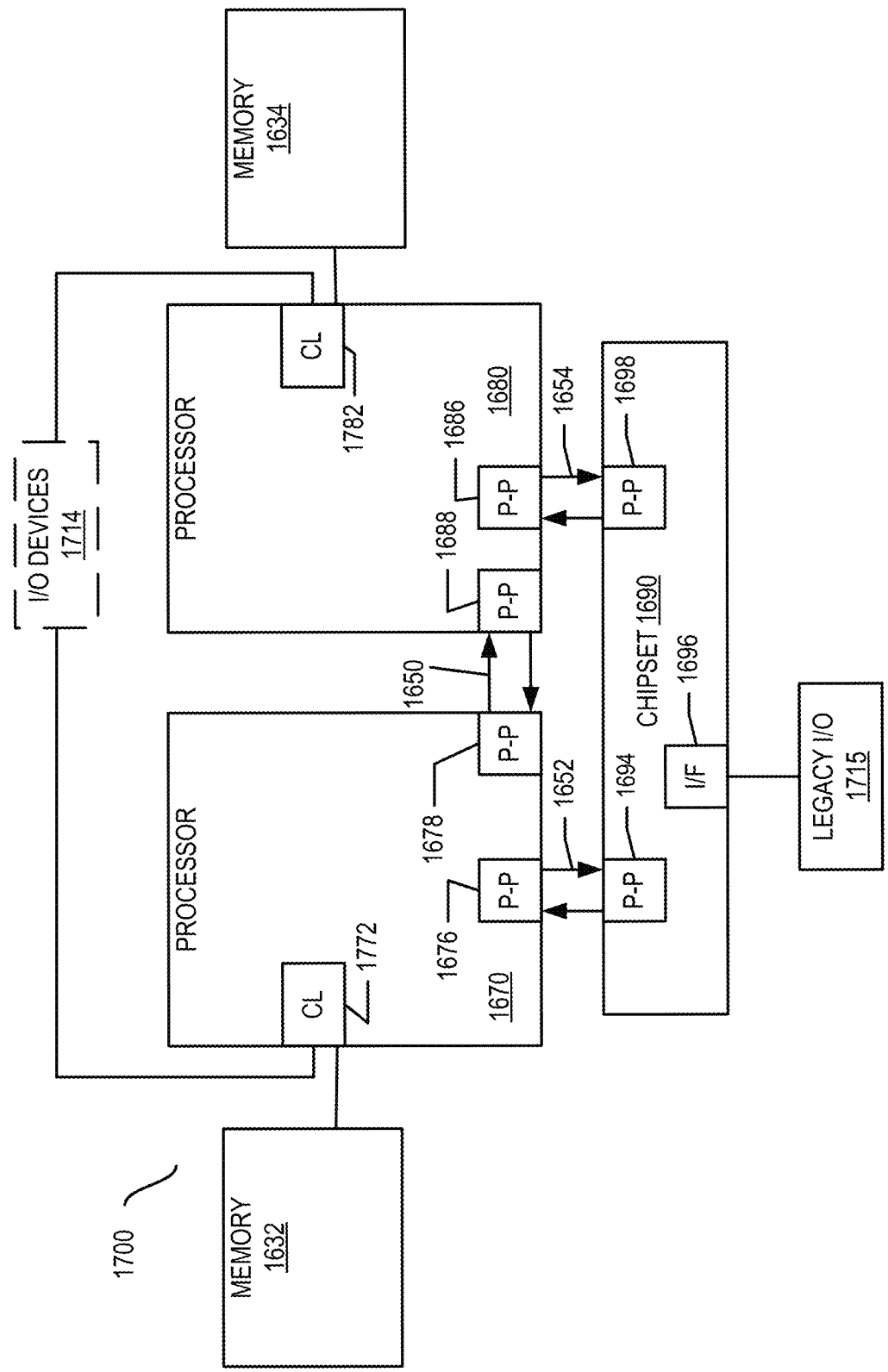

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
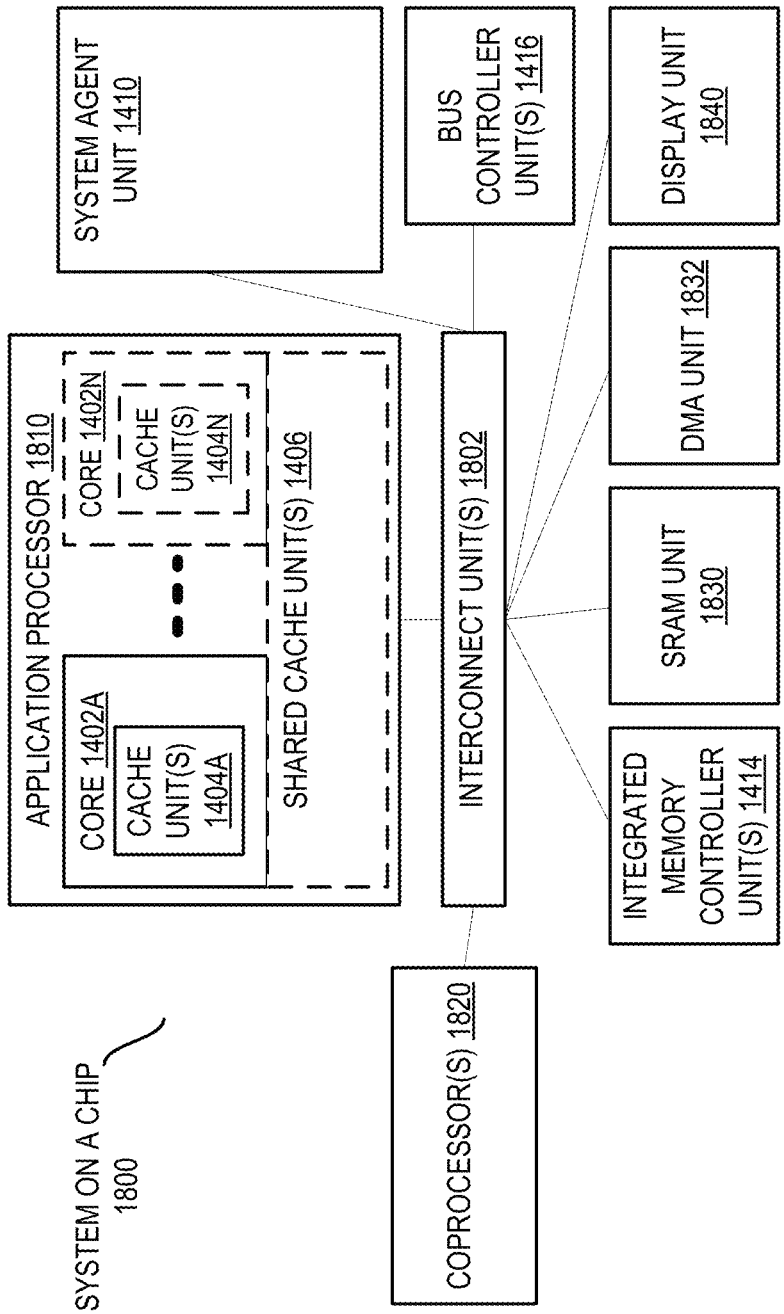

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Further Examples

Example 1 provides an exemplary processor including: fetch circuitry to fetch a compress instruction having fields to specify locations of a source vector having N single-precision formatted elements, and a compressed vector having N neural half-precision (NHP) formatted elements, decode circuitry to decode the fetched compress instruction, execution circuitry to respond to the decoded compress instruction by: converting each element of the source vector into the NHP format, rounding each converted element according to a rounding mode, and writing each rounded element to a corresponding compressed vector element, wherein the NHP format includes seven significand bits, and eight exponent bits, and wherein the source and compressed vectors are each either in memory or in registers.

Example 2 includes the substance of the exemplary processor of Example 1, wherein the fetch, decode, and execution circuitry are further to fetch, decode, and execute a second compress instruction specifying locations of a second source vector having N elements formatted according to the single-precision format, and a second compressed vector having N elements formatted according to the NHP format, wherein the fetch and decode circuitry is further to fetch and decode a vector multiply instruction having fields to specify first and second source vectors having N NHP-formatted elements, and a destination vector having N single-precision-formatted elements, wherein the specified source vectors are the compressed vector and the second compressed vector, and wherein the execution circuitry is further to respond to the decoded vector multiply instruction, for each of the N elements, by generating a 16-bit product of the compressed vector element and the second compressed vector element, and accumulating the generated 16-bit product with previous contents of a corresponding element of the destination vector.

Example 3 includes the substance of the exemplary processor of Example 1, wherein the fetch circuitry is further to fetch an expand instruction having fields to specify locations of a destination vector having N elements formatted according to the single-precision format and the compressed vector, decode circuitry to decode the fetched expand instruction, execution circuitry to respond to the decoded expand instruction by: converting each element of the compressed vector into the single-precision format, and writing each converted element to a corresponding destination vector element.

Example 4 includes the substance of the exemplary processor of Example 2, wherein the vector multiply instruction further has a field to specify a writemask, the specified writemask including N bits, each bit to identify either when the corresponding element of the destination vector is unmasked and to be written with the generated 16-bit product, or when the corresponding element of the destination vector is mapped and is either to be zeroed or merged.

Example 5 includes the substance of the exemplary processor of any of Examples 1-4, wherein the single-precision format is a binary32 format standardized by the Institute of Electrical and Electronics Engineers (IEEE) as part of the IEEE 754-2008 standard.

Example 6 includes the substance of the exemplary processor of any of Examples 1-4, wherein the specified source and compressed vectors each occupy one or rows of a matrix having M rows by N columns.

Example 7 includes the substance of the exemplary processor of any of Examples 1-4, wherein the execution circuitry is further to perform rounding, as necessary, when converting, accumulating, and multiplying, according to a rounding mode.

Example 8 includes the substance of the exemplary processor of Example 1, wherein the rounding mode is one of round to nearest even, round toward negative infinity, round toward positive infinity and round toward zero, and wherein the rounding mode is specified either on a per-instruction basis by an immediate value specified by the instruction, or on an embedded basis by a software-programmable control and status register.

Example 9 includes the substance of the exemplary processor of Example 5, wherein the rounding mode is specified by the IEEE 754 standard and is one of round to nearest with ties to even, round to nearest with ties away from zero, round toward zero, round toward positive infinity, and round toward negative infinity, and wherein the rounding mode is specified either on a per-instruction basis by an immediate value specified by the instruction, or on an embedded basis by a software-programmable control and status register.

Example 10 includes the substance of the exemplary processor of any of Examples 1-4, wherein the execution circuitry is further to perform saturation, as necessary, when accumulating and multiplying.

Example 11 provides an exemplary method including: fetching, using fetch circuitry, a compress instruction having fields to specify locations of a source vector having N single-precision formatted elements, and a compressed vector having N neural half-precision (NHP) formatted elements, decoding, using decode circuitry, the fetched compress instruction, responding, using execution circuitry, to the decoded compress instruction by: converting each element of the source vector into the NHP format, rounding each converted element according to a rounding mode, and writing each rounded element to a corresponding compressed vector element, wherein the NHP format includes seven significand bits, and eight exponent bits, and wherein the source and compressed vectors are each either in memory or in registers.

Example 12 includes the substance of the exemplary method of Example 11, further including: fetching, decoding, and executing, using the fetch, decode, and execution circuitry, a second compress instruction specifying locations of a second source vector having N elements formatted according to the single-precision format, and a second compressed vector having N elements formatted according to the NHP format, fetching and decoding, using the fetch and decode circuitry, a vector multiply instruction having fields to specify first and second source vectors having N NHP-formatted elements, and a destination vector having N single-precision-formatted elements, wherein the specified source vectors are the compressed vector and the second compressed vector, and responding, using the execution circuitry, to the decoded vector multiply instruction, for each of the N elements, by generating a 16-bit product of the compressed vector element and the second compressed vector element, and accumulating the generated 16-bit product with previous contents of a corresponding element of the destination vector.

Example 13 includes the substance of the exemplary method of Example 11, further including: fetching, using the fetch circuitry, an expand instruction having fields to specify locations of a destination vector having N elements formatted according to the single-precision format and the compressed vector, decoding, using the decode circuitry, the fetched expand instruction, responding, using execution circuitry, to the decoded expand instruction by: converting each element of the compressed vector into the single-precision format, and writing each converted element to a corresponding destination vector element.

Example 14 includes the substance of the exemplary method of Example 12, wherein the vector multiply instruction further has a field to specify a writemask, the specified writemask including N bits, each bit to identify either when the corresponding element of the destination vector is unmasked and to be written with the generated 16-bit product, or when the corresponding element of the destination vector is mapped and is either to be zeroed or merged.

Example 15 includes the substance of the exemplary method of any of Examples 11-14, wherein the single-precision format is a binary32 format standardized by the Institute of Electrical and Electronics Engineers (IEEE) as part of the IEEE 754-2008 standard.

Example 16 includes the substance of the exemplary method of any of Examples 11-14, wherein the specified source and compressed vectors each occupy one or rows of a matrix having M rows by N columns.

Example 17 includes the substance of the exemplary method of any of Examples 11-14, wherein the execution circuitry is further to perform rounding, as necessary, when converting, accumulating, and multiplying, according to a rounding mode.

Example 18 includes the substance of the exemplary method of Example 11, wherein the rounding mode is one of round to nearest even, round toward negative infinity, round toward positive infinity and round toward zero, and wherein the rounding mode is specified either on a per-instruction basis by an immediate value specified by the instruction, or on an embedded basis by a software-programmable control and status register.

Example 19 includes the substance of the exemplary method of Example 15, wherein the rounding mode is specified by the IEEE 754 standard and is one of round to nearest with ties to even, round to nearest with ties away from zero, round toward zero, round toward positive infinity, and round toward negative infinity, and wherein the rounding mode is specified either on a per-instruction basis by an immediate value specified by the instruction, or on an embedded basis by a software-programmable control and status register.

Example 20 includes the substance of the exemplary method of any of Examples 11-14, wherein the execution circuitry is further to perform saturation, as necessary, when accumulating and multiplying.

What is claimed is:

1. A processor comprising:
   fetch circuitry to fetch a compress instruction having fields to specify locations of a source vector having N single-precision formatted elements, and a compressed vector having N neural half-precision (NHP) formatted elements;
   decode circuitry to decode the fetched compress instruction;
   execution circuitry to respond to the decoded compress instruction by:
      converting each element of the source vector into the NHP format;
   rounding each converted element according to a rounding mode; and
      writing each rounded element to a corresponding compressed vector element;
   wherein the NHP format comprises seven significand bits, and eight exponent bits;
   wherein the source and compressed vectors are each either in memory or in registers;
   wherein the fetch, decode, and execution circuitry are further to fetch, decode, and execute a second compress instruction specifying locations of a second source vector having N elements formatted according to the single-precision format, and a second compressed vector having N elements formatted according to the NHP format;
   wherein the fetch and decode circuitry is further to fetch and decode a mixed-precision vector multiply-accumulate (MPVMAC) instruction having fields to specify first and second source vectors having N NHP-formatted elements, and a destination vector having N single-precision-formatted elements; wherein the specified source vectors are the compressed vector and the second compressed vector; and
   wherein the execution circuitry is further to respond to the decoded MPVMAC instruction, for each of the N elements, by generating a 16-bit product of the compressed vector element and the second compressed vector element and accumulating the generated 16-bit product with previous contents of a corresponding element of the destination vector.

2. The processor of claim 1, wherein the MPVMAC instruction further has a field to specify a writemask, the specified writemask comprising N bits, each bit to identify either when the corresponding element of the destination vector is unmasked and to be written with the generated 16-bit product, or when the corresponding element of the destination vector is mapped and is either to be zeroed or merged.

3. The processor of claim 1,
   wherein the fetch circuitry is further to fetch an expand instruction having fields to specify locations of a destination vector having N elements formatted according to the single-precision format and the compressed vector;

wherein the processor further comprises:

decode circuitry to decode the fetched expand instruction; and execution circuitry to respond to the decoded expand instruction by:

converting each element of the compressed vector into the single-precision format; and writing each converted element to a corresponding destination vector element.

4. The processor of claim 1, wherein the single-precision format is a binary32 format standardized by the Institute of Electrical and Electronics Engineers (IEEE) as part of the IEEE 754-2008 standard.

5. The processor of claim 4, wherein the rounding mode is specified by the IEEE 754 standard and is one of round to nearest with ties to even, round to nearest with ties away from zero, round toward zero, round toward positive infinity, and round toward negative infinity, and wherein the rounding mode is specified either on a per-instruction basis by an immediate value specified by the instruction, or on an embedded basis by a software-programmable control and status register.

6. The processor of claim 1, wherein the specified source and compressed vectors each occupy one or rows of a matrix having M rows by N columns.

7. The processor of claim 1, wherein the execution circuitry is further to perform rounding when converting, accumulating, and multiplying, according to the rounding mode.

8. The processor of claim 1, wherein the rounding mode is one of round to nearest even, round toward negative infinity, round toward positive infinity and round toward zero, and wherein the rounding mode is specified either on a per-instruction basis by an immediate value specified by the instruction, or on an embedded basis by a software-programmable control and status register.

9. The processor of claim 1, wherein the execution circuitry is further to perform saturation, as necessary, when accumulating and multiplying.

10. A method comprising:

fetching, using fetch circuitry, a compress instruction having fields to specify locations of a source vector having N single-precision formatted elements, and a compressed vector having N neural half-precision (NHP) formatted elements;

decoding, using decode circuitry, the fetched compress instruction;

responding, using execution circuitry, to the decoded compress instruction by:

converting each element of the source vector into the NHP format;

rounding each converted element according to a rounding mode;

writing each rounded element to a corresponding compressed vector element;

wherein the NHP format comprises seven significand bits, and eight exponent bits;

wherein the source and compressed vectors are each either in memory or in registers;

fetching, decoding, and executing, using the fetch, decode, and execution circuitry, a second compress instruction specifying locations of a second source vector having N elements formatted according to the single-precision format, and a second compressed vector having N elements formatted according to the NHP format;

fetching and decoding, using the fetch and decode circuitry, a mixed-precision vector multiply-accumulate (MPVMAC) instruction having fields to specify first and second source vectors having N NHP-formatted elements, and a destination vector having N single-precision-formatted elements, wherein the specified source vectors are the compressed vector and the second compressed vector; and responding, using the execution circuitry, to the decoded MPVMAC instruction, for each of the N elements, by generating a 16-bit product of the compressed vector element and the second compressed vector element, and accumulating the generated 16-bit product with previous contents of a corresponding element of the destination vector.

11. The method of claim 10, wherein the MPVMAC instruction further has a field to specify a writemask, the specified writemask comprising N bits, each bit to identify either when the corresponding element of the destination vector is unmasked and to be written with the generated 16-bit product, or when the corresponding element of the destination vector is mapped and is either to be zeroed or merged.

12. The method of claim 10, further comprising:

fetching, using the fetch circuitry, an expand instruction having fields to specify locations of a destination vector having N elements formatted according to the single-precision format and the compressed vector;

decoding, using decode circuitry, the fetched expand instruction;

responding, using execution circuitry, to the decoded expand instruction by:

converting each element of the compressed vector into the single-precision format; and writing each converted element to a corresponding destination vector element.

13. The method of claim 10, wherein the single-precision format is a binary32 format standardized by the Institute of Electrical and Electronics Engineers (IEEE) as part of the IEEE 754-2008 standard.

14. The method of claim 13, wherein the rounding mode is specified by the IEEE 754 standard and is one of round to nearest with ties to even, round to nearest with ties away from zero, round toward zero, round toward positive infinity, and round toward negative infinity, and wherein the rounding mode is specified either on a per-instruction basis by an immediate value specified by the instruction, or on an embedded basis by a software-programmable control and status register.

15. The method of claim 10, wherein the specified source and compressed vectors each occupy one or rows of a matrix having M rows by N columns.

16. The method of claim 10, wherein the execution circuitry is further to perform rounding when converting, accumulating, and multiplying, according to the rounding mode.

17. The method of claim 10, wherein the rounding mode is one of round to nearest even, round toward negative infinity, round toward positive infinity and round toward zero, and wherein the rounding mode is specified either on a per-instruction basis by an immediate value specified by the instruction, or on an embedded basis by a software-programmable control and status register.

18. The method of claim 10, wherein the execution circuitry is further to perform saturation, as necessary, when accumulating and multiplying.

* * * * *